(12) United States Patent
Hammann

(10) Patent No.: US 10,115,076 B2
(45) Date of Patent: Oct. 30, 2018

(54) SYSTEM AND METHOD EMPLOYING CAPACITY/DEMAND MANAGEMENT FOR HUMAN-FACTOR RESOURCES

(75) Inventor: Jerald A. Hammann, Minneapolis, MN (US)

(73) Assignee: GoalAssist Corporation, Minneapolis, MN (US)

( * ) Notice: Subject to any disclaimer, the term of this patent is extended or adjusted under 35 U.S.C. 154(b) by 1894 days.

(21) Appl. No.: 09/840,332

(22) Filed: Apr. 23, 2001

(65) Prior Publication Data

US 2002/0055865 A1 May 9, 2002

Related U.S. Application Data

(60) Provisional application No. 60/198,816, filed on Apr. 21, 2000.

(51) Int. Cl.
*G06Q 10/00* (2012.01)
*G06Q 10/10* (2012.01)
*G06Q 10/06* (2012.01)

(52) U.S. Cl.
CPC ............ *G06Q 10/10* (2013.01); *G06Q 10/06* (2013.01); *G06Q 10/0631* (2013.01); *G06Q 10/06375* (2013.01)

(58) Field of Classification Search
CPC ............................... G06Q 10/00; G06Q 30/02
USPC ...................... 705/7–10, 7.11–7.42
See application file for complete search history.

(56) References Cited

U.S. PATENT DOCUMENTS

| | | | |
|---|---|---|---|
| 4,937,743 A * | 6/1990 | Rassman et al. | 705/8 |
| 5,255,181 A | 10/1993 | Chapman et al. | |
| 5,255,184 A | 10/1993 | Hornick et al. | |
| 5,270,921 A | 12/1993 | Hornick | |
| 5,291,394 A | 3/1994 | Chapman | |
| 5,299,115 A | 3/1994 | Fields et al. | |
| 5,369,570 A | 11/1994 | Parad | |
| 5,404,291 A | 4/1995 | Kerr et al. | |

(Continued)

OTHER PUBLICATIONS

Knowledge Technology, "AI @ Work," PC AI, vol. 12, No. 3, pp. 39-40 (May-Jun. 1998). (INSPEC Abstract No. C9809-7170-001).

(Continued)

*Primary Examiner* — Robert D Rines

(74) *Attorney, Agent, or Firm* — Dicke, Billig & Czaja, PLLC

(57) ABSTRACT

A computer-based system and method loads data for individual resources and composite resources from a resource revenue management system into a yield management system. The individual resources include human-factor resources. Each composite resource includes a collection of individual resources. Internal data structures are constructed for linking each of the resources to their associated composite resources and for linking each of the composite resources to their associated resources. Yield management techniques are used to interpret the data and to provide a set of revenue-maximizing transaction parameters under which a resource network offers its composite resources for transactions with users. The transaction parameters are transferred from the yield management system into the resource revenue management system. The resource revenue management system communicates with users, creating transactions for the composite resources using the values calculated by the yield management system.

5 Claims, 22 Drawing Sheets

(56) References Cited

U.S. PATENT DOCUMENTS

| | | | | |
|---|---|---|---|---|
| 5,418,713 | A * | 5/1995 | Allen | 705/32 |
| 5,630,070 | A * | 5/1997 | Dietrich et al. | 705/8 |
| 5,640,569 | A | 6/1997 | Miller et al. | |
| 5,712,985 | A * | 1/1998 | Lee et al. | 705/7 |
| 5,918,209 | A * | 6/1999 | Campbell | G06Q 10/02 705/5 |
| 5,991,739 | A | 11/1999 | Cupps et al. | |
| 6,049,774 | A | 4/2000 | Roy | |
| 6,061,691 | A | 5/2000 | Fox | |
| 6,078,866 | A | 6/2000 | Buck et al. | |
| 6,188,989 | B1 * | 2/2001 | Kennedy | 705/8 |
| 6,253,187 | B1 | 6/2001 | Fox | |
| 6,263,315 | B1 * | 7/2001 | Talluri | 705/8 |
| 6,269,361 | B1 | 7/2001 | Davis et al. | |
| 6,298,331 | B1 * | 10/2001 | Walker et al. | 705/15 |
| 6,526,392 | B1 * | 2/2003 | Dietrich et al. | 705/400 |
| 6,584,447 | B1 * | 6/2003 | Fox et al. | 705/10 |
| 6,609,101 | B1 * | 8/2003 | Landvater | 705/10 |
| 6,741,969 | B1 * | 5/2004 | Chen et al. | 705/14 |
| 6,922,672 | B1 * | 7/2005 | Hailpern et al. | 705/14 |
| 6,993,494 | B1 | 1/2006 | Boushy et al. | |
| 7,188,073 | B1 * | 3/2007 | Tam et al. | 705/7.16 |
| 2001/0039514 | A1 * | 11/2001 | Barenbaum et al. | 705/14 |
| 2001/0051932 | A1 * | 12/2001 | Srinivasan et al. | 705/400 |
| 2002/0013734 | A1 | 1/2002 | Bueno | |
| 2002/0042738 | A1 * | 4/2002 | Srinivasan et al. | 705/14 |
| 2002/0107720 | A1 | 8/2002 | Martin | |
| 2002/0169657 | A1 | 11/2002 | Singh et al. | |
| 2002/0198756 | A1 * | 12/2002 | Ghaisas et al. | 705/8 |
| 2003/0046120 | A1 * | 3/2003 | Hoffman et al. | 705/7 |
| 2003/0233278 | A1 * | 12/2003 | Marshall | 705/14 |

OTHER PUBLICATIONS

Ward Systems Group, Inc., Predicting Consumer Response, www.wardsystems.com, pp. 2, (May-Jun. 1998).

A PCT International Search Report for International Application No. PCT/US02/35229 dated Apr. 11, 2003 (5 pages).

Desiraju, Ramarao et al., "Strategic Service Pricing and Yield Management," *Journal of Marketing*, pp. 44-56, (Jan. 1999).

Kimes, Sheryl E., "Yield Management: A Tool for Capacity-Constrained Service Firms," *Journal of Operations Management*, vol. 8 No. 4, pp. 348-363, (Oct. 1989).

Screenshots of Ward Systems Group Inc., www.wardsystems.com, pp. 13 (Jan. 25, 1999). Retrieved Jan. 26, 2004. Retrieved from google.com and archive.org.

* cited by examiner

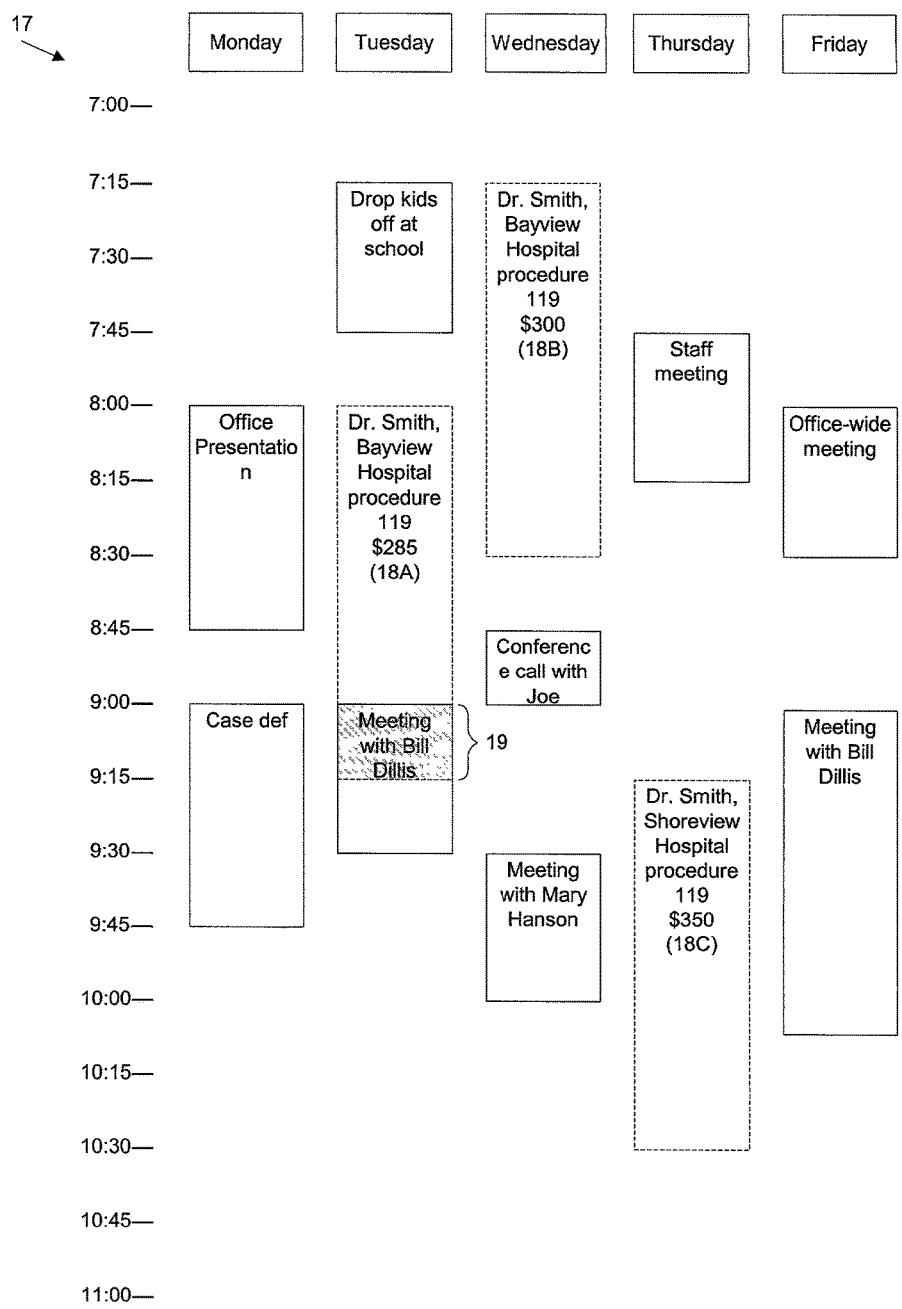

Figure 6

Resource List
32

| 1 | 265 | 101 | Room 2 | 15 | 1 |
|---|-----|-----|--------|----|----|
| 2 | 265 | 101 | Room 3 | 60 | 1 |
| 3 | 265 | 243 | Doctor A | 80 | 1 |
| 4 | 265 | 313 | Microscope A | 70 | 1 |
| ⋮ | ⋮ | ⋮ | ⋮ | ⋮ | ⋮ |
| n | n | 101 | Racquetball court | 2 | 6 |

35 ← last row 36 37 38 39 40 41

Composite Resource List
33

| 117 | 265 | Appendicitis    | 101 | 00 | 50  | 211 | 15 | 45  |     |    |    |
|-----|-----|-----------------|-----|----|-----|-----|----|-----|-----|----|----|
| 118 | 265 | Angioplasty     | 101 | 00 | 180 | 101 | 30 | 135 | 101 | 15 | 30 |
| 119 | 265 | Growth removal  | 101 | 00 | 45  | 243 | 00 | 30  | 313 | 00 | 30 |
| 120 | 265 | Chemotherapy    | 112 | 00 | 20  | 112 | 00 | 20  | 112 | 00 | 20 |
| ⋮   | ⋮   | ⋮               | ⋮   | ⋮  | ⋮   | ⋮   | ⋮  | ⋮   | ⋮   | ⋮  | ⋮  |
| n   | n   | Haircut         | n   | s  | d   | n   | s  | d   | n   | s  | d  |

42 ← last row 43 37 44 45¹ᵃ 45¹ᵇ 45¹ᶜ 45²ᵃ 45²ᵇ 45²ᶜ 45ⁿᵃ 45ⁿᵇ 45ⁿᶜ

Demand Records List
34

| 1 | 265 | 200011190700 | 200011190714 | 300 | 4 | 2 |
|---|-----|--------------|--------------|-----|---|---|
| 2 | 265 | 200011190715 | 200011190729 | 250 | 3 | 4 |
| 3 | 265 | 200011190730 | 200011190744 | 160 | 3 | 3 |
| 4 | 265 | 200011190745 | 200011190759 | 120 | 6 | 2 |
| ⋮ | ⋮ | ⋮ | ⋮ | ⋮ | ⋮ | ⋮ |
| n | n | start time | end time | 100 | 4 | 2 |

46 ← last row 43 37 47 48 49 50 51

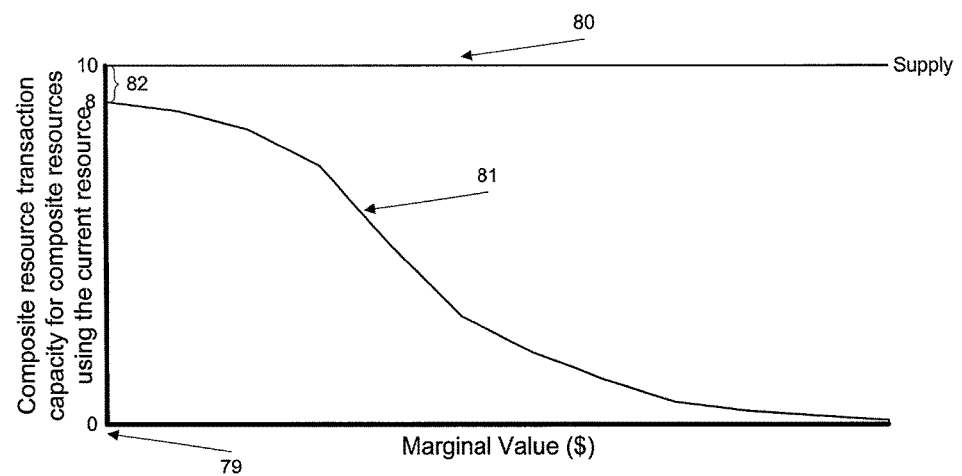

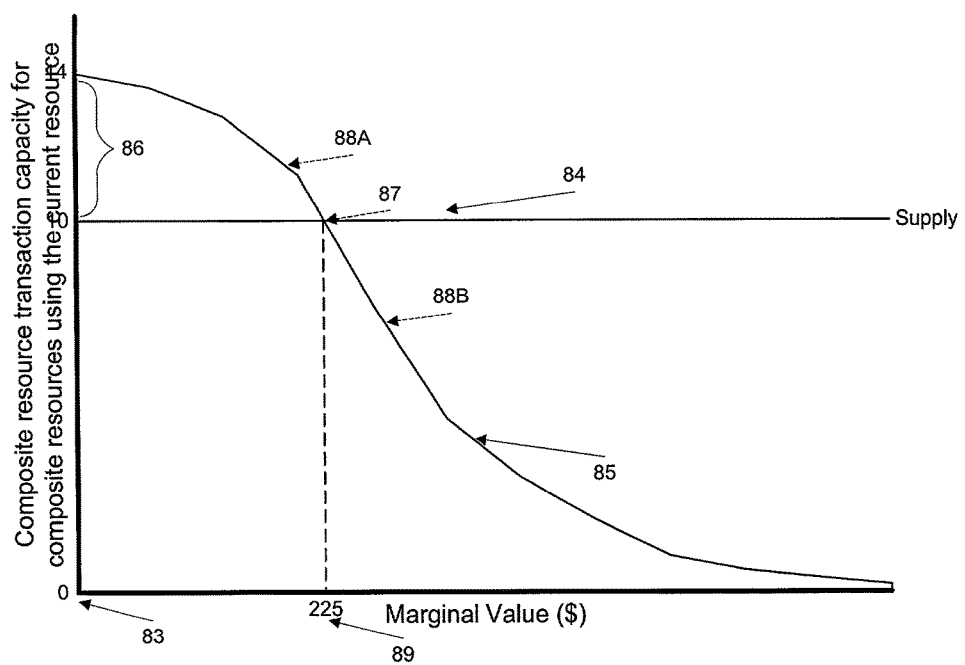

Figure 14B

Composite Resource
Demand Curve Points

| | Price | Demand |
|---|---|---|
| 120A | 300 | 0.0 |
| 120B | 295 | 3.6 |
| 120C | 250 | 4.0 |
| 120D | 241 | 6.7 |
| 120E | 160 | 7.0 |
| 120F | 156 | 9.7 |
| 120G | 120 | 10.0 |
| 120H | 118 | 15.4 |
| 120I | 100 | 16.0 |
| 120J | 90 | 19.6 |
| 120K | 0 | 20.0 |

Sample Calculation

| | | | | | | |
|---|---|---|---|---|---|---|
| 151A | 0 | 0 | 0 | 0 | 0 | 170 |
| 151B | 4 | 680 | 2 | 170 | 5 | 132 |
| 151C | 8 | 1208 | 5 | 151 | 9 | 120 |
| 151D | 11 | 1568 | 9 | 143 | 13 | 95 |
| | 152 | 153 | 154 | 155 | 156 | 157 |

SYSTEM AND METHOD EMPLOYING CAPACITY/DEMAND MANAGEMENT FOR HUMAN-FACTOR RESOURCES

CROSS REFERENCE TO RELATED APPLICATIONS

This Non-Provisional Utility Patent Application claims the benefit of the filing date of U.S. Provisional Application Ser. No. 60/198,816, filed Apr. 21, 2000, entitled "METHOD, SYSTEM, ARTICLE OF MANUFACTURE AND METHOD OF MANUFACTURE FOR PERFORMING TRANSACTIONS INVOLVING COMPOSITE RESOURCES COMPRISED OF AT LEAST ONE HUMAN-FACTOR RESOURCE UTILIZING A YIELD MANAGEMENT SYSTEM."

THE FIELD OF THE INVENTION

The present invention generally relates to employing yield management to selected types of industries, and more particularly to employing yield management in human-factor resource industries.

BACKGROUND OF THE INVENTION

Human-factor resource industries are herein defined to be those industries in which a human factor of production participates in individual transactions with users in a one-to-one relationship, where each individual transaction exceeds a sufficient de minimus schedule interval, such as approximately 10 minutes or those industries in which the human factors of production directly interactive with the end user (whether in a one-to-one or a one-to-many relationship) comprise a significant percentage of total costs, such as approximately 15% or greater.

Also, as the value of the human-factor resources increases, the applicable de minimus schedule interval or percentage of total cost percentage declines. A comparative example demonstrating this relationship is that of a medical surgeon, where, regardless of schedule interval or percentage of total costs, the person is a human-factor resource to an office receptionist, where even a long one-to-one schedule interval or a high percentage of total cost precludes the person from being a human-factor resource.

Examples of one-to-one relationships in human-factor resource industries include, a physician engaging in a transaction with one patient at a time; a cosmetologist serving one customer at a time; an employee or independent contractor serving one employer at a time.

Conventionally, business promotion on the basis of price are relatively rare. Examples of such promotion activities include: a recent medical procedure promotion advertised LASIK eye surgery at a transaction price of $2,995 for both eyes at a particular outpatient surgery center; a haircut has been advertised at a transaction price of $10 through a particular branded cosmetology resource network; and, an individual seeking to offer his or her services to a potential employer might advertise a transaction price of $11 per hour.

Furthermore, these prices, once promoted were constant. When a transaction price is advertised, it is generally for any and all potential users at any and all resource network locations, for any available composite resource in the resource network and for any and all times in which the composite resource is made available for transactions. Price-promotion methods in the existing human-factor resource industries are often too inflexible and result in very costly promotion programs if a resource network desired to limit an offer to fewer users, locations, composite resources, or transaction times.

The words "yield management" have a variety of meanings in the present field of invention. For the purpose of this application, the definition of the term, is taken from the perishable resource industry (where the terms "yield management and "revenue management" are often used interchangeably) to mean "a multiperiod pricing strategy in which each price is a function of forecasted excess capacity" (See Ramarao Desiraju & Steven M Shugan, Strategic Service Pricing and Yield Management, 63 Journal of Marketing 1, pp. 44-56 (1999), incorporated herein by reference).

Yield management systems have a long successful history in the perishable resource industries, such as the airline, hotel and car rental industries. In these industries, yield management systems have contributed to substantial increases in profitability, even at relatively small increases in revenue.

In the perishable resource industries, several different types of yield management systems have emerged. These systems are generally classified by Sheryl Kimes in "Yield Management: A Tool for Capacity-Constrained Service Firms." Journal of Operations Management 8, no. 4 (1989): p. 348-363, the disclosure of which is incorporated herein by reference. Kimes highlights several classes of solution techniques, which she generally categorizes as: (1) mathematical programming, (2) economics-based, (3) threshold curve and (4) expert systems. Although each method of implementing yield management may require an entirely different calculation system, all methods of implementing yield management techniques in a computer-based system attempt to better match the supply of a resource to the demand for a resource.

In addition to classifying yield management techniques currently in use, Kimes describes the necessary conditions under which yield management techniques can be appropriately applied. Kimes lists the following six characteristics: (1) when a firm is operating at a relatively fixed capacity, (2) when demand can be segmented into clearly-identified partitions, (3) when inventory is perishable, (4) when product is sold well in advance, (5) when demand fluctuates substantially, and (6) when marginal sales costs and production costs are low, but capacity change costs are high.

These characteristics well describe the area of perishable resource industry yield management.

There is a desire to apply yield management to the human-factor resource industries. However, four of the above-described six necessary conditions under which yield management techniques can be appropriately applied do not generally apply to the human-factor resource industries.

First, in the human-factor resource industries, capacity is not relatively fixed (per definition element 1), but is highly variable. Resource networks and human-factor resources make decisions on a regular basis which change the available supply of composite resources. Hiring additional human-factor resources, changing the availability parameters of existing resources and human-factor resource decision to change their own availability parameters, sometimes at the last second, in response to demand demonstrate contributory factors to a highly elastic supply. Rather than static and unchanging, the capacity of a particular human-factor resource industry is likely to be highly variable, incorporating such interdependent factors as the time of day, the day of week, the nature of the composite resource and its price curve relative to other similar composite resource, the grouping of reserved demand against the declared capacity and the economic and social trade-offs made by every human-factor resource.

Second, the word perishability (per definition element 3) has a weak meaning in human-factor resource industries. The term perishability only applies in a very limited commercial sense; the human-factor resource has alternative uses for his or her commercial asset. Their asset, time, becomes unavailable for commercial use after a certain date, time or similar temporal event, but may be put to other uses in lieu of its commercial use or may be put to a differing commercial or non-commercial use. For example, a human-factor resource proficient in both women's hairstyling and manicures may perform a haircut, give a manicure, perform other commercial services, other facility-management or administrative tasks, engage in continuing professional education or may devote his or her time to non-professional use.

Third, product is not always sold well in advance (per definition element 4) in human-factor resource industries. Most frequently, the entire transaction (offer, acceptance and consumption) takes place on-premise with only, in some instances, a transaction reservation preceding the transaction and taking place off-premise.

Finally, capacity change costs (per definition element 6) are generally low in human-factor resource industries (as noted above). Furthermore, traditionally, marginal sales costs are extremely high in human-factor resource industries, requiring a general audience marketing program.

There are several industries for which the distinction between whether the industry is characterized by perishable resources or human-factor resources is blurred. Notable among these industries is the healthcare industry and the restauran industry. Such industries lend themselves to comparison with perishable resource industries because the machine and physical plant component of a transaction is similar to that of other perishable resource industries. For example, a hospital stay is similar to a hotel stay and a restaurant seat is similar to an airplane seat. At the same time, they lend themselves to comparison with human-factor resource industries because the human component of a transaction is of a one-to-one nature with an interface duration of greater than a de minimus duration or the human-factor cost relative to the total product or service cost is significant.

To eliminate ambiguity around the distinction between perishable resource industries and human-factor industries, the following delineating characteristics will suffice: perishable resource industries are industries in which an employed human factor of production, if present, participates in multiple individual transactions simultaneously (i.e., a one-to-many transaction relationship), while an employed human factor of production in human-factor industries participates in individual transactions sequentially (i.e., a one-to-one transaction relationship), where each individual transaction exceeds a sufficient de minimus schedule interval, such as approximately 10 minutes or while those employed human factors of production directly interactive with the end user (whether in a one-to-one or a one-to-many relationship) comprise a significant percentage of total costs, such as approximately 15% or greater. Also, as the value of the human-factor resources increases, the applicable de minimus schedule interval or percentage of total cost percentage declines.

The following example transactions fall within the human-factor resource industries:

Unlicensed and licensed personal and professional services such as those rendered by accountants, lawyers, legal assistants, consultants, financial service providers, realtors, insurance agents, travel agents, automotive repair technicians, building contractors, interior decorators, tailors, landscapers, architects, personal trainers, personal counselors, career counselors, health counselors, cleaning services, hair stylists, massage therapists, dieticians, salon/spa professionals, personal escort services, personal security services, lawn care specialists, daycare providers, and psychical service providers;

Medical services such as those rendered by primary care and specialty physicians, nursing staff operating in one-to-one work environments, medical care specialists, dentists, dental assistants, optometrists, opthamologists, cosmetic surgeons, physical therapists, occupational therapists, psychologists, psychiatrists, pharmacists, social workers, allergists, and alternative medical service providers;

Prepared food services such as those provided by quick service, casual dining, fine dining, take-out and delivery service providers;

Educational services provided in a one-to-one transaction environment such as those rendered by sports instructors, vocal instructors, musical instrument instructors, religious instructors and professional skill trainers;

Regulatory and governmental services such as those rendered by compliance inspectors, social service workers, sheriff's officers, police officers, firefighters and emergency response personnel; and Services provided by employees and independent contractors.

While various example transactions falling within the human-factor resource industries are particularly listed above, it will be understood by those skilled in the art that various additional transactions will also satisfy the criteria for inclusion within the human-factor industries.

The following example transactions fall outside the human-factor resource industries:

Perishable resource industry services such as those rendered by airlines, hotels, rental car companies, golf courses, bowling alleys and arena or stadium sporting/entertainment event-providers;

Mass-produced durable and consumer goods transactions such as automotive, computer, electronic, clothing and grocery transactions.

SUMMARY OF THE INVENTION

One aspect of the present invention provides a computer-based method of determining marginal values for individual resources. The method includes loading data related to individual resources and associated composite resources from a resource revenue management system into a marginal value system. The individual resources include human-factor resources. The associated composite resources each include a collection of at least two of the individual resources. The method includes constructing internal data structures, in the marginal value system, which link each of the individual resources to their associated composite resources and link each of the composite resources to their associated individual resources. The method includes, determining marginal values, in the marginal value system, for the individual resources with a continuous optimization function using the internal data structures. The method includes storing the marginal values from the marginal value system into the resource revenue management system.

One aspect of the present invention provides a computer-based marginal value system coupled to a computer-based resource revenue management system. The marginal value system includes an input device configured to receive data related to individual resources and associated composite resources from the resource revenue management system. The individual resources include human-factor resources. The associated composite resources each include a collection of at least two of the individual resources. The marginal value system includes at least one processor configured to construct internal data structures which link each of the individual resources to their associated composite resources and link each of the composite resources to their associated individual resources. The at least one processor also is configured to determine marginal values for the individual resources with a continuous optimization function using the internal data structures. The marginal value system includes memory storing the data related to the individual resources and the associated composite resources, the internal data structures, and at least one program for controlling the at least one processor.

One aspect of the present invention provides a method of producing a marginal value representing currency determined using a computer-based marginal value system for use in a computer-based resource revenue management system for granting and denying a sale of one or more composite resources, comprising at least one human-factor resource, being made unavailable at a future time depending on marginal values for each of such composite resources received from the computer-based resource revenue management system. The method includes loading data for human-factor resources, composite resources, and a resource value from the computer-based resource revenue management system into the computer-based marginal value system. The method includes constructing internal data structures for the human-factor resources, composite resources, and resource value. The method includes determining marginal values for the human-factor resources using a continuous optimization function. The method includes storing the marginal values from the computer-based marginal value system into the computer-based resource revenue management system.

One aspect of the present invention provides a computer-based method of determining marginal values for human-factor resources. The method includes loading data related to individual resources and associated composite resources from a resource revenue management system into a marginal value system. The individual resources include human-factor resources. The associated composite resources each include a collection of at least two of the individual resources. The method includes constructing internal data structures, in the marginal value system, which link each of the individual resources to their associated composite resources and link each of the composite resources to their associated individual resources. The method includes evaluating a locally optimal marginal value for one of the human-factor resources using a continuous optimization function dependent on the marginal values for other of the individual resources. The method includes iteratively reevaluating the locally optimal marginal value until a globally optimal marginal value is attained for the one of the human-factor resources.

One aspect of the present invention provides a marginal value system for determining marginal values for human-factor resources. Computerized means evaluates a locally optimal marginal value for one of the human-factor resources using a continuous optimization function dependent on the marginal values for other resources. Computerized means iteratively reevaluates the locally optimal marginal value until a globally optimal marginal value is attained for the one of the human-factor resources.

One aspect of the present invention provides a computer-based method for yield management. The method includes determining transaction parameter values for composite resources having at least one human-factor resource which includes a transaction price calculated using yield management techniques. The method includes communicating the transaction parameter values for at least one composite resource to at least one potential user of the composite resource.

One aspect of the present invention provides a computer-based yield management system including means for determining transaction parameter values for composite resources having at least one human-factor resource which includes a transaction price calculated using yield management techniques. The yield management system further includes means for communicating the transaction parameter values for at least one composite resource to at least one user.

One aspect of the present invention provides a yield management system including a storage device storing a program. The yield management system includes a processor connected to the storage device and controlled by the program. The processor operative with the program determines transaction parameter values for composite resources having at least one human-factor resource which includes an offer price calculated using yield management techniques, and communicates the transaction parameter values for at least one composite resource to at least one user.

One aspect of the present invention provides a computer-readable medium containing program instructions for controlling a computer to perform a method including receiving data related to individual resources and associated composite resources. The individual resources include human-factor resources. The associated composite resources each include a collection of at least two of the individual resources. The method includes storing the data related to the individual resources and the associated composite resources. The method includes constructing internal data structures which link each of the individual resources to their associated composite resources and link each of the composite resources to their associated individual resources. The method includes determining marginal values for the individual resources with a continuous optimization function using the internal data structures. The method includes storing the internal data structures.

One aspect of the present invention provides a computer-based method for producing composite resource transactions. The method includes determining transaction parameter values for composite resources having at least one human-factor resource which includes an offer price calculated using yield management techniques. The method includes communicating the transaction parameter values for at least one composite resource to at least one user. The method includes receiving a responding communication from at least one user binding at least one composite resource with specified transaction parameter values.

Still other embodiments of the present invention will become readily apparent to those skilled in the art from the following detailed description, where is shown and described only embodiments of the invention by way of illustration of the wide range of modes contemplated for carrying out the invention. As will be realized, the invention is capable of other and different embodiments and its several details are capable of modification in various obvious respects, all without departing from the scope of the present invention. Accordingly, the drawings and detailed description are to be regarded as illustrative in nature and not as restrictive.

A yield management system overcomes the inflexibility and price barriers in existing human-factor resource industries. Through utilization of a computer-based yield management system, human-factor resource industries can modify transaction prices to better match demand for composite resources possessing specified transaction parameters, such as composite resource, resource network, resource network location, and transaction date/time, with the available supply of composite resources. The end result is more profitable user transactions and improved human-factor resource utilization.

BRIEF DESCRIPTION OF THE DRAWINGS

FIG. 3 is a visual user interface used by users, an embodiment of the user interface in the transaction reservations system of FIG. 2;

FIG. 6 shows data structures used by the marginal value system of FIG. 2;

FIGS. 10A and 10B show graphs of resource demand curves generated by the resource demand determination function of FIG. 8;

FIG. 14B is a table showing, by way of example, the results of a demand curve construction;

FIG. 17C is a table showing, by way of example, the calculation of protection levels;

DETAILED DESCRIPTION OF THE PREFERRED EMBODIMENTS

Figure 1:
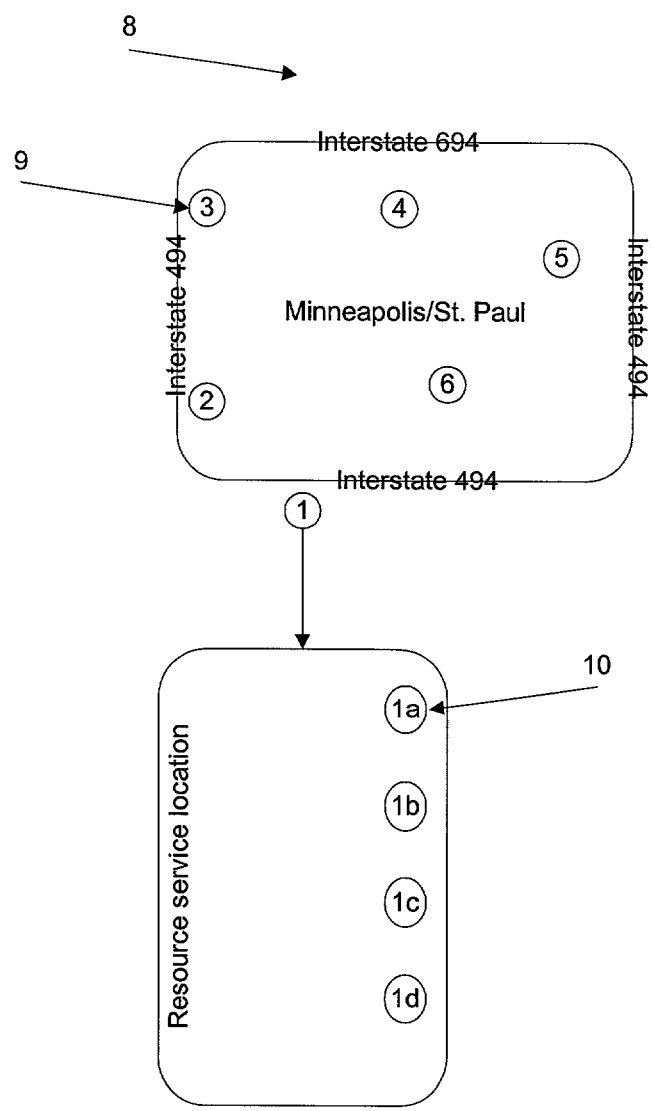
FIG. 1 is, by way of example, an outline map of the topology for a simple resource network.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Glossary of Terms

"Yield management" or "Revenue management" refers to "a multiperiod [transaction] pricing strategy in which each [transaction] price is a function of forecasted excess capacity" (See Ramarao Desiraju & Steven M Shugan, Strategic Service Pricing and Yield Management, 63 Journal of Marketing 1, pp. 44-56 (1999), incorporated herein by reference). Sheryl Kimes in "Yield Management: A Tool for Capacity-Constrained Service Firms." Journal of Operations Management 8, no. 4 (1989): p. 348-363, the disclosure of which is incorporated herein by reference) highlights several classes of solution techniques, which she generally categorizes as: mathematical programming, economics-based, threshold curve and expert systems. Although each method of implementing yield management may require an entirely different calculation system, all methods of implementing yield management techniques in a computer-based system perform the exact same function, namely, attempting to better match the supply of a resource to the demand for a resource.

"Transaction price" refers to a collection of goods, services and monetary value requested by one party to a transaction in exchange for another collection of goods, services and monetary value they desire to exchange. Yield management systems generally match supply and demand for a particular composite resource by modifying transaction prices. Such modification may take the form of a modified monetary value or a modification in the collection of goods or services transacted. Modified monetary values are often implemented by price changes, price discounts or premiums, price rebates or other monetary value-modifying methods. Modification of the collection of goods and services often include offering higher or lower-value goods or services, offering additional free goods or services or other good or service-modifying methods.

"Transaction parameters" refers to a set of variables describing composite resources. Transaction parameters include, but are not limited to, transaction price parameters, composite resource availability (date/time) parameters, and various profile (described below) parameters.

"Resource" or "Individual Resource" refers to a factor of production. Historically, the three factors of production have fallen into the generalized categories of land, labor and capital.

"Human-factor resource" refers to a human resource participating in individual transactions sequentially (i.e., a one-to-one transaction relationship), where each individual transaction exceeds a sufficient de minimus schedule interval, such as approximately 10 minutes or refers to a human resource interacting with the end user (whether in a one-to-one or a one-to-many relationship) where the human interaction with the end user comprises a significant percentage of total costs, such as approximately 15% or greater. Also, as the value of the human-factor resources increases, the applicable de minimus schedule interval or percentage of total cost percentage declines.

"One-to-one" refers to a resource-defined transaction type where a resource interacts with a single user at a time. This transaction type contrasts with the other resource-defined transaction type, the "one-to-many" interaction (the "one-to-one" and "one-to-many" comprising the only two resource-defined transaction types), where one resource interacts with many users. An educational instructor teaching a class of one to eight users (students) likely engages in periods both of one-to-one and one-to-many relationships during his instruction; when the educational instructor teaches a class of thirty users, the relationship is likely a one-to-many relationship.

"Composite resource" refers to a collection of resources that a user typically will purchase as a bundle at a single price. For example, a surgical procedure is a composite resource that may be made up of the operating room, surgeons, anaesthesiologists, residents, nurses, technicians, specialized pieces of equipment and the like. Although all transactions involve a mix of land, labor and capital resources, traditionally some composite resources, such as a haircut, have been typically described as requiring a single resource (i.e., a cosmetician). Such transactions are actually composite resources and are classified as such in this invention.

"Resource network" refers to the collection of resources (both human-factor and nonhuman-factor) used by an entity to form composite resources, which are then made available for use to users. Examples of resource networks range in size from networks comprising thousands of geographically dispersed resources performing hundreds of unique composite resources to a single resource (since even a single resource has embedded sub-resources of land, labor and capital resources) capable of performing a single composite resource.

"Demand forecast" represents a prediction of the number of resource or composite resource transactions that users will request to reserve for a future set of transaction parameters (among them, date/time and transaction price) specified by statistical parameters, such as mean and variance. It also can include forecasts of cancellations and no-shows.

"User profile" or "user network profile" or "human-factor resource profile" or "composite resource profile" or "resource network profile" refers to a collection of demographic, psychographic, attitudinal, preference, performance, qualification, historical transaction and other variables used for facilitating optimal transactions. For example, a user may desire to transact with a female, hair stylist, with over five years of experience, who is a licensed cosmetologist, who works for a specified human-factor resource network, who has a user-based performance rating of 4.5 or greater on a 5.0 scale, who transacts business within 5 miles of the user's home or place of work, who is available between 3:30 p.m. and 5:00 p.m. on Wednesday May 16$^{th}$, 2000 and who likes to talk about children. One of the plurality of human-factor resources fitting that description may desire to transact only with users who are over the age of 18, who are female, who have a gratuity rating of 4.0 or greater on a 5.0 scale and who has human-factor resource-based performance rating of 3.0 or greater on a 5.0 scale.

"Profiling" refers to a method where a user, user network, resource or resource network queries the stored profile of another user, user network, resource or resource network.

"Means for communicating" refers to any and all methods of communication between two parties desiring to make a transaction. Such means include, by way of example, price lists, price boards, price quotes, verbal communications or computer-based communications. Still other methods comprising means of communicating for the present invention will become readily apparent to those skilled in the art without departing from the scope of the present invention. Accordingly, the examples offered are to be regarded as illustrative in nature and not as restrictive.

"Computer-based communications" refers to any and all forms of communication between computing devices (such as computers, television two-way communication devices, mobile phones, analog phones, PSTN phones, two-way radio devices, PDAs, PDCs and the like). Communications represent the exchange of data through land-based (PSTN, ISDN, FDDI, T-1, T-3, ATM, Frame Relay, SMDS, SNA, Ethernet, Fast Ethernet, MBONE, IP, RSVP, CAP, TCP/IP, other telephony, other cable, other fiber optics and the like), mobile and radio frequency systems (GSM, AMPS, FDMA, CDMA, TDMA, iDEN, PDC, packet radio network, other mobile and radio frequency (RF) systems and the like) and protocols (LMDS, DECT, MAC, microwave, wireless local loop, GPRS, PPDC, SMS, CDMA, PCS, satellite-based, IrDA, FastInfrared, Serial Infrared, 3G, Bluetooth, SWAP, WAP, Symbian, EDGE, X.25, MGCP, H.323, SIP, PCI, CompactPCI, PMC, xDSL, T1/E1, HSSI, DS3/E3 and OC-3, PPP, Frame Relay and ATM, DAVIC/DVB, MCNS and the like). Still other forms of computer-based communications will become readily apparent to those skilled in the art without departing from the scope of the present invention. Accordingly, the examples offered are to be regarded as illustrative in nature and not as restrictive.

"Memory" refers to information stored on storage media comprising magnetic tape, magnetic disk, optical disc, compact disc (CD), digital video disc (DVD), hard disk, floppy disk, ferroelectric memory, electrically erasable programmable read only memory (EEPROM), flash memory, EPROM, read only memory, static random access memory (SRAM), dynamic random access memory (DRAM), ferromagnetic memory, optical storage, charge coupled devices, smart cards, transistor-configured IC memory and the like. Still other forms of storage media will become readily apparent to those skilled in the art without departing from the scope of the present invention. Accordingly, the examples offered are to be regarded as illustrative in nature and not as restrictive.

"Attention-eliciting method" refers to any of a number of methods that excite the sensory organs to draw attention to a particular item, whether visual, auditory, olfactory, organoleptic or through the sense of touch. Common attention-eliciting methods currently being used in the field of electronic commerce, by way of example, include: differing the appearance relative to nearby visual objects, shading, texturing, embossing, causing to appear sunken, enlarging, shrinking, movement, causing to appear (for example, in a pop-up message) or disappear, flashing, requiring user-action (as in a keystroke, mouse click or other method), communicating an auditory signal or message or through textured surfaces intended to communicate meaning (as in the Braille alphabet or the raised surfaces on the J-key, F-key or 5-digit of a keyboard).

II. Yield Management using a Marginal Value System
A. Network Topology

FIG. 1 shows, by way of example, an outline map of the topology for a simple resource network 8. The resource network 8 comprises a plurality of resource service locations 9 (represented by 1, 2, 3, 4, 5, and 6 in the diagram), with each service location being composed of a plurality of composite resources 10 (represented by 1a, 1b, 1c and 1d in the diagram). Although, by way of example, the resource network 8 depicted is located within a metropolitan geographic area, such a network could readily be, by way of example, much smaller (covering a transaction reservation system confinable within the human body) or much larger (covering a transaction reservation system between satellites circling the globe).

B. Transaction Reservations System

Figure 2:
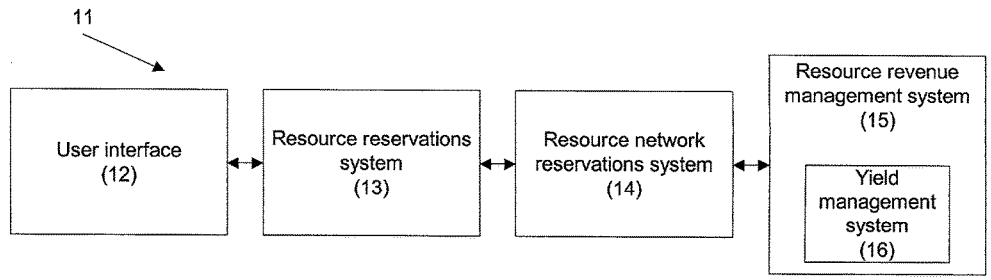
FIG. 2 is a functional block diagram of a transaction reservations system.

FIG. 2 is a functional block diagram of a transaction reservations system 11, used, by way of example, for granting or denying the reservation of transactions based on marginal values. The transaction reservations system 11 comprises five components: a user interface 12, a resource reservations system 13, a resource network reservations system 14, a resource revenue management system 15 and a marginal value system (YMS) 16. Although only one of each type of component is shown, a typical human-factor transaction reservations system 11 would comprise multiple user interfaces 12, resource reservations systems 13, resource network reservations systems 14, resource revenue management systems 15 and marginal value systems 16.

Each resource reservations system 13, resource network reservations system 14, resource revenue management system 15 and yield management system 16 can be embodied as a general purpose programmed computer system (not shown) that operates on a set of instructions in the form of a computer program. Such a general purpose programmed computer system contains a central processing unit, volatile memory, secondary storage and other components conventional in the art, including a cathode ray tube (CRT) or other type of display and a keyboard entry device.

Each user interface 12 is, by way of example, a conventional personal computer or other digital device (see Computer-based communications, above) having an input device, such as a keyboard, mouse, touchpad, stylus, or voice recognition software package; a display device (optional), such as a video monitor; a processing device such as a CPU; and a network interface such as a modem or digital or optical switch. Alternatively, user interface 12 may also include wireless communication systems, voice mail systems, other electronic or voice communications systems, fax machines or pagers.

The user interface 12 is used for submitting availability and reservations requests to the resource reservations system 13 and for receiving data in reply from the resource reservations system 13. An availability request queries, by way of example, whether a composite resource 10 possessing a defined profile is available for possibly different service times or whether possibly multiple composite resources 10 possessing a defined profile or a plurality of composite resources 10 within multiple resource networks 9 are available for a specified service time. A reservation request specifically asks for a reservation for a composite resource 10 or a plurality of composite resources 10 There are multiple human-factor resource network reservations systems 14 associated with the resource reservations system 13. To determine the availability of reservable time, the resource reservations system 13 sends availability and reservation requests to each resource network reservations system 14 involved in the user's request. Information about the human-factor resources 10 including their associated resource location 9, in the resource network 8 (shown in FIG. 1) is, by way of example, managed and stored in the resource network reservations system 14. Such information is accessible by the user interface 12 and the resource reservations system 13 for the profiling and selection of individual human-factor resources 10 the human-factor resource networks 8 and the plurality of human-factor resource networks exchanging information with the resource reservations system 13.

The resource network reservations system 14 accepts, counter-offers or denies the reservation requests that it receives from the resource reservations system 13 or a locally-connected terminal (not shown) based on various factors, including marginal values received from the resource revenue management system 15. The resource revenue management system 15 calculates resource availability according to profiling information and service time and processes reservation requests using stored marginal values.

Part of the resource revenue management system 15 is the yield management system (YMS) 16. In the described embodiment, the YMS 16 is a computer program that is executed by the resource revenue management system 15. It is also envisioned that the YMS 16 can be a special purpose computer formed on an integrated circuit chip (or set of chips) or executable computer code burned into a read-only memory (ROM) chip that can be read in by conventional means or as microcode. An exemplary example of a yield management system 16 is the marginal value system product licensed under the trademark of Marginal Value Engine™ manufactured by Decision Focus Incorporated, Mountain View, Calif. Marginal Value Engine™ and MVE™ are trademarks owned by Decision Focus Incorporated.

In a preferred embodiment, the purpose of the YMS 16 is to determine system-wide optimal marginal values for use by the resource revenue management system 15. The YMS 16 periodically receives a demand forecast, user value and the supply of future time segments remaining to be booked for selected human-factor resources as inputs from the resource revenue management system 15. This same data could also be retrieved from a storage device (not shown) commonly accessible by both the resource revenue management system 15 and the marginal value system 16. A demand forecast predicts the number of reservations that will be or is expected to be made between now and the future time segment expressed in terms of statistical parameters, such as mean and variance. The user value is a function of the user profile, the point of sale, the human-factor resource and the human-factor resource profile. The supply of time segments remaining to be booked is calculated from the capacity of the time segments assigned by the resource revenue management system 15 minus the seats already booked plus an over-reservation factor to account for cancellations and no-shows. The number of human-factor resource time segments that can be solved at one time is limited only by the computer memory available. A very large resource network 9 can be solved on a large computer.

In response, the YMS 16 sends substantially optimal marginal values for the human-factor resource time segments selected to the resource revenue management system 15 for immediate use or storage or stores them directly into the commonly accessible storage device (not shown).

In the described embodiment, the YMS 16 is a computer program written in the C++ object-oriented programming language. It is preferably structured as a class library capable of managing at least one resource network 8 using the same transaction reservations system 11. However, any suitable programming language can be employed and the YMS 16 can be embodied on any suitable computer system configuration.

Figure 2A:
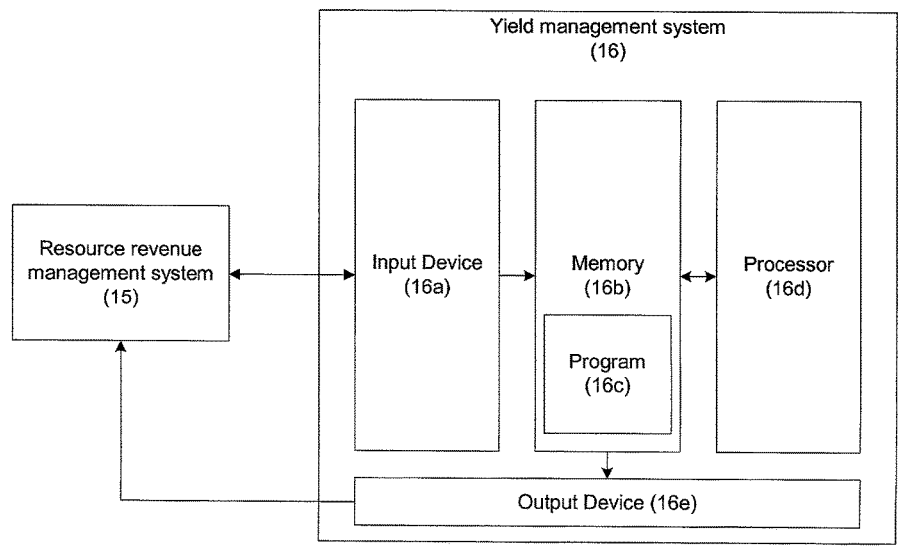
FIG. 2A is a block diagram of a yield management system for determining marginal values.

FIG. 2A is a block diagram of a yield management system 11, used, by way of example, for determining marginal values. The resource revenue management system 15 links to an input device 16a within the marginal value system (YMS) 16. The input device 16a links to a memory 16b where a program 16c for calculating marginal values is stored. The memory 16b links to a processor 16d, the processor using the program 16c and values brought into memory 16b through the input device 16a to calculate marginal values and return them to the memory 16b. The memory 16b links to an output device 16e, which transmits marginal values to the resource revenue management system 15.

C. User Interface

FIG. 3 depicts an embodiment of a user interface 12, by way of example, a visual user interface 17. The days of a week are labeled across the top. The time is shown at the left in FIG. 3, starting with 7:00 a.m., based on a 24-hour clock. The availability of multiple reservation times for the medical procedure this user has been requested by their primary care physician to schedule are shown as potential appointments times within the user's personal or business calendar. An exemplary example of a calendar application functioning as a user interface 12 is the desktop information management product licensed under the trademark of Microsoft Outlook™ manufactured by Microsoft Corporation, Redmond, Wash. Microsoft Outlook™ is a trademark owned by Microsoft Corporation.

FIG. 3 depicts three possible appointment times for the user's procedure, two at the Bayview Hospital and one at the Shoreview Hospital. In the described embodiment, a dashed border is used to indicate the unconfirmed nature of these appointments, although any number of attention-eliciting methods could be used to distinguish between a prospective appointment and a scheduled appointment. The prospective appointment times, 8:15 a.m. on Tuesday (prospective reservation 18A), 7:30 a.m. on Wednesday (prospective reservation 18B), and 8:30 a.m. on Thursday (prospective reservation 18C), are characterized as being those times in the particular week where the user's primary care physician, Dr. Smith, is available, all resources that are a part of the composite resource being scheduled, "procedure 119", are available and all user, resource, and resource network profile preferences have been meet. The composite resources comprising procedure 119 are represented in the case mno in the resource network reservations system shown in FIG. 3B, and include a surgery room, a doctor (and more specifically, Dr. Smith) and a microscope. Finally, each of these appointments has a differing transaction price, calculated by the YMS 16 maintained in the resource revenue management system 15.

Already having an existing appointment scheduled on Tuesday, the user opts to offer to schedule the appointment on Wednesday morning at 7:30 a.m. In the described embodiment, the conflict between a prospective appointment and an existing scheduled appointment is denoted by shading of the conflicting time period 19, although any number of attention-eliciting methods could be used.

Once the user has offered to schedule his or her appointment for Tuesday, in the described embodiment, by double-clicking or right-clicking the appointment object and selecting, "request appointment" from the menu, the remaining two options for the appointment disappear.

This appointment request now goes to the resource network reservations system 15.

Although the embodiment describes a user interface 12 comprising a visual user interface 17 displaying a schedule, other embodiments (in part described at Transaction reservation system, above) would accomplish the same purpose.

In another embodiment of the present invention, the user interface 12 comprises a visual user interface 17 displaying an offer list.

In another embodiment of the present invention, the user interface 12 comprises a visual user interface 17 displaying a reservation availability list.

In another embodiment of the present invention, the user interface 12 comprises a visual user interface 17 displaying a composite resource availability list.

In another embodiment of the present invention, the user interface 12 comprises a visual user interface 17 displaying a composite resource list.

In another embodiment of the present invention, the user interface 12 is a human agent.

In another embodiment of the present invention, the user interface 12 is a voice response interface.

In another embodiment of the present invention, the user interface 12 is a heads-up display screen.

In another embodiment of the present invention, the user interface 12 is a numeric display screen.

In another embodiment of the present invention, the user interface 12 is an alphanumeric display screen.

In another embodiment of the present invention, the user interface 12 is an e-mail messaging system.

In another embodiment of the present invention, the user interface 12 is a task status communication system.

In another embodiment of the present invention, the user interface 12 is a fax communication system.

In another embodiment of the present invention, the user interface 12 is a holographic or other multidimensional system.

In another embodiment of the present invention, the user interface 12 is a visual imaging visor.

In another embodiment of the present invention, the user interface 12 is a retinal imaging system.

Still other embodiments of a user interface 12 will become readily apparent to those skilled in the art. It has herein been shown and described only embodiments of the invention by way of illustration of the wide range of modes contemplated for carrying out the invention. As will be realized, the user interface is capable of other and different embodiments and its several details are capable of modification in various obvious respects, all without departing from the scope of the present invention. Accordingly, the detailed descriptions above are to be regarded as illustrative in nature and not as restrictive.

D. Resource Network Reservations System

Figure 4:
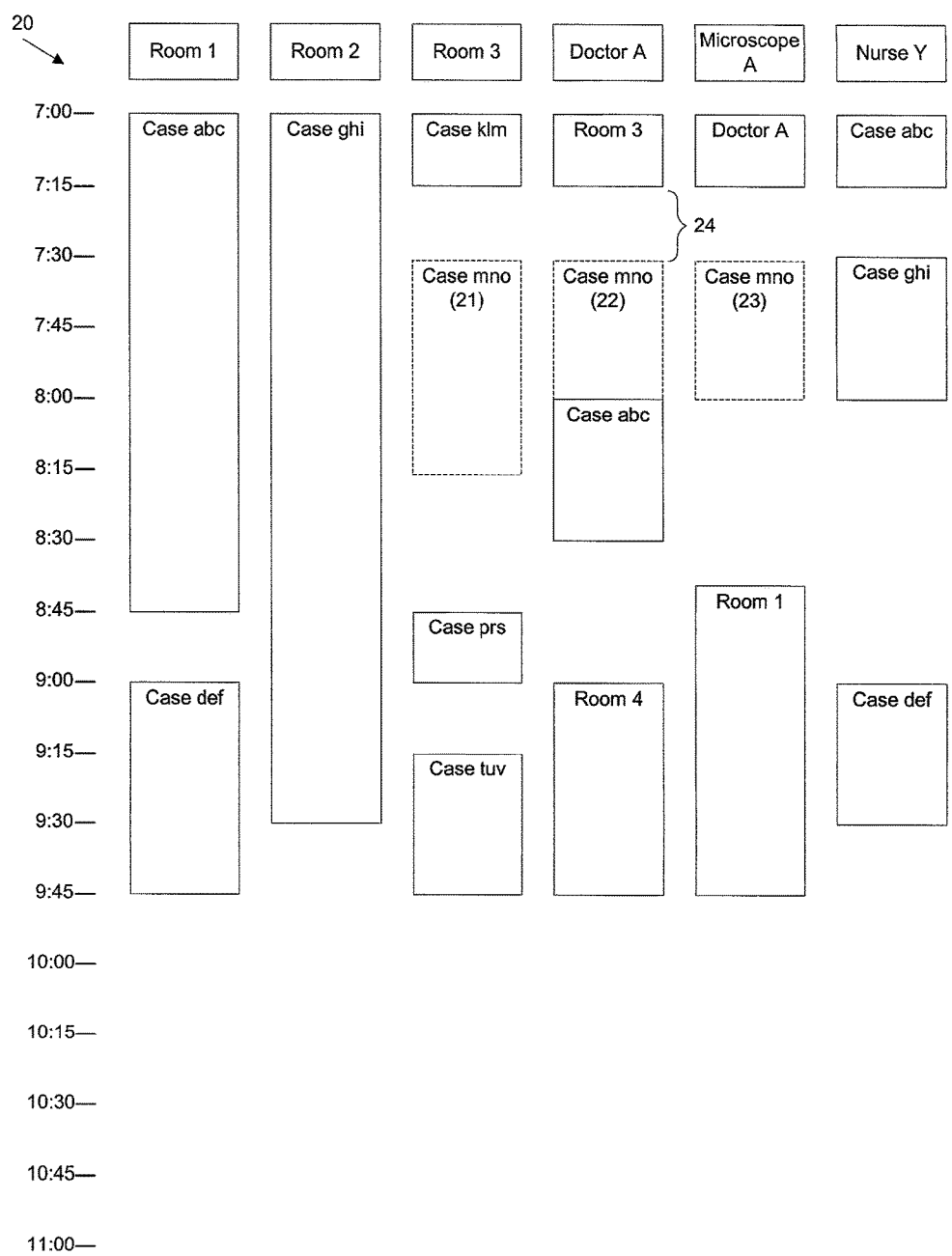
FIG. 4 is a visual resource interface used by resource networks, an embodiment of an interface to a resource network reservations system in the transaction reservations system of FIG. 2.

FIG. 4 is a visual resource interface 20 to a resource network reservations system 15. It shows a mixture of resources and their availability in time. The resources are labeled across the top. The time is shown at the left in FIG. 4, starting with 7:00 a.m., based on a 24-hour clock. It is usually most convenient to have all of the primary resources in a display of the same type, such as rooms. However, such uniformity is not essential. As can be seen, the primary resources selected for display in FIG. 4 are of three different types. The primary resources in the first three columns, "Room 1", "Room 2", and "Room 3", are of one type, but the primary resources of the last three columns, are of two other types. The primary resource of column 4 is a surgeon, the primary resources of column 5 is a microscope and the primary resource of column 6 is a nurse.

In FIG. 4, "Room 1" can be taken to refer to a surgical operating room. From 7:00 a.m. to 8:45 a.m., "Case abc" is scheduled to occupy "Room 1". Thereafter, "Case def" will be in "Room 1" from 9:00 a.m. to 9:45 a.m.

Room 2 has "Case ghi" from 7:00 a.m. to 9:30 a.m. Room 3 has "Case klm" from 7:00 a.m. to 7:15 a.m. "Case prs" follows from 8:45 a.m. to 9:00 a.m. and then "Case tuv" from 9:15 a.m. to 9:45 a.m.

While there may be many surgeons involved, only the activities of the surgeon "Doctor A" (Dr. Smith, from the above example) are shown. "Doctor A" will be in Room 3 from 7:00 a.m. to 7:15 a.m., involved in "Case abc" from 8:00 a.m. to 8:30 a.m. and in Room 4 (not displayed) from 9:00 a.m. to 9:45 a.m. "Microscope X" will be used by "Doctor A" from 7:00 a.m. to 7:15 a.m. and will be in room 1 from 8:45 a.m. to 9:45 a.m. Also, the resource "Nurse Y" will be used for "Case abc" from 7:00 a.m. to 7:15 a.m. (even though "Case abc" will continue long after 7:15 a.m.) and will then move to "Room 2" for "Case ghi" (already in progress) from 7:30 a.m. to 8:00 a.m. Resource "Nurse Y" is then shown as being assigned to "Case def" from 9:00 a.m. to 9:30 a.m.

Case "mno" (from the previous example) is shown as a reservation request, requesting the reservation of "Room 3" (reservation request 21), "Doctor A" (reservation request 22) and "Microscope X" (reservation request 23) to comprise the composite resource, "procedure 119", at 7:30 a.m. In the described embodiment, a dashed border is used to indicate the unconfirmed nature of these appointments, although any number of attention-eliciting methods could be used to distinguish between a prospective appointment and a scheduled appointment.

Notice that the resources comprising the composite resource, "procedure 119", have been scheduled for 7:30 a.m. (In FIG. 4), while the user's appointment is scheduled for 7:15 a.m. (in FIG. 3). Such a situation would occur if the resource network profile for the resource network reservations system 14 indicated that a 15 minute period should be placed in front of the first resource reservation request by a user during a day (in this case, to fill out medical and insurance forms).

Notice also that the descriptor for the composite resource, "procedure 119", describes the action desired from the transaction involving a set of resources, rather the resources themselves. Other descriptive methods could be used where a resource or composite resource is described by various grammatical structures, such as nouns, verbs, adjectives and adverbs.

In the example as has been described in User Interface (above), where valid appointment times with associated transaction prices were suggested to the user by the resource network reservations system 14 in view of the user, resource and resource network profiles, along with yield management information from the resource revenue management system 15, the system would normally accept the user's reservation request. However, by way of example, if the system were to accept the user's reservation given the resource commitments described in FIG. 3, a potentially undesirable 15 minute gap will have been created in "Doctor A's" schedule. Rather than accept the reservation request for case "mno", the resource network's profile might have an option selected where, whenever possible, the system attempts to schedule certain high marginal value or highly capacity constraining resources in contiguous blocks (or some other schedule-optimizing method). Under such a profile setting, the resource network reservations system 14 would counter-offer the user's request, offering to schedule the user for 7:00 a.m. rather than 7:15 a.m., thereby eliminating the discontiguous time block 24. Such a feature might entail viewing the user's calendar to check for availability before making a counter-offer to improve the likelihood of success.

The display in FIG. 4 represents the results of a prospective scheduling of activities and has been presented for a predetermined time period. Revising the time scale (from 15 minute to 30 minute intervals, for example) will allow the operator to see further into the future but will result in the size of the scheduling indicia to be physically reduced. The distances between cells under each resource will also shrink so that resolution of adjacent cases in time may not be discernible. Such shrinking of the time scale will also permit less information, for example, about secondary resources, to be displayed within each cell.

In the described embodiment, the user is requesting a transaction, an appointment for a composite resource, procedure 119. In another embodiment, the user may be entering into a binding commitment to a transaction, where the penalty for failing to fulfill their part in the transaction might result in the loss of consideration envisioned by the transaction, or a lower or higher consideration. A customer of a hair salon, by way of example, may lose the entire amount of his or her consideration for a transaction (and possibly even an amount to account for a standard gratuity in the industry), if they were to fail to appear for an appointment they had previously scheduled. In yet another embodiment, the user may request multiple transaction times, where the other party to the transaction, may accept one, none or all of the user's request, and at a full transaction price, or a premium or discount thereof at the initiation by the user or the other party.

As these separate embodiments demonstrate, users themselves are composite resources, comprising at the least a human-factor resource and a capital resource. An individual or network of human-factor and/or composite resources may operate both as users and as resources. By way of example, an individual with a user profile comprising both an individual (demographic, professional, etc.) and composite (asset and other profiles) profile, may offer their services as an employee to a resource network for a capital resource (i.e., a transaction price or wage) or alternatively, may accept the transaction price offered by a resource network. That resource network may offer the individual's services to other users at a set price or at the other users' prices. The individual or resource network may also engage in other transactions, alternating indiscriminately between the role of the user and the resource, offering elements of their asset portfolio (time, money or other) in exchange for elements of another's asset portfolio (time, money or other). Although it is likely that most transactions managed by the transaction reservation system 11 will involve a human-factor resource (i.e., time, and more particularly, time in a one-to-one transaction) and a capital resource (i.e., money), neither is a required resource.

Furthermore, previous embodiments of a user interface 12 were described in User Interface, above. These same embodiments, among others, would be equally suitable for the Resource network reservations system, and are incorporated herein by reference.

E. Method for Using Marginal Values

Figure 5:
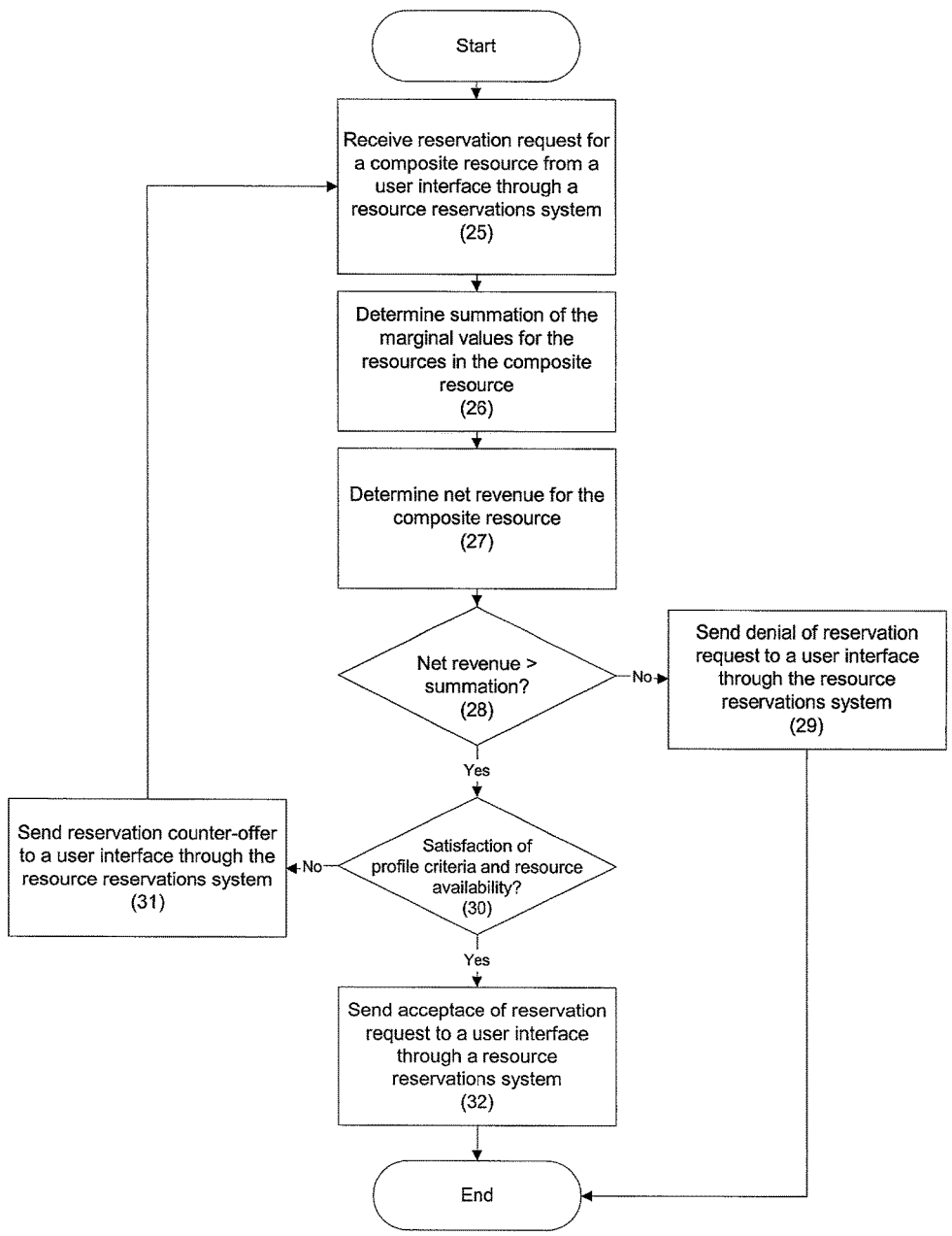
FIG. 5 is a flow diagram of a method for using marginal values in the transaction reservations system of FIG. 2.

FIG. 5 is a flow diagram of a method for using marginal values in the resource network reservations system 14 of FIG. 2. Marginal values determined by the YMS 16 are used by the resource network reservations system 14 in granting or denying the reservation of a transaction for a resource or composite resource. It is feasible that the marginal values determined by the YMS 16 could be used in different ways than described herein by resource reservations systems 14 and resource revenue management systems 15. Moreover, it is feasible that the event triggering the use of marginal values is a date, week, month, year or other future temporal event instead of or in addition to a time.

A reservation request is received by the resource network reservations system 14 for a resource or composite resource from the user interface 12 through the resource reservations system 13 (block 25). The resource network reservations system 14 determines a summation of the marginal values for the resources contained in the resource or composite resource (block 26) to establish a total marginal value for the resource or composite resource. The resource network reservations system 15 also determines the net revenue for the same resource or composite resource (block 27). The summation of the marginal values is compared to the net revenue and if the net revenue exceeds the summation of the marginal values for the resource or composite resource (block 28), and furthermore, if a resource is available and if the user profile, resource profile and the resource network profile do not express conflicts with the reservation (block 30), an acceptance of the reservation request is sent to the user interface 12 through the resource reservations system 13 (block 29). If the net revenue is less than the summation of the marginal values (block 28), it is not profitable to accept the reservation request and a denial of the reservation request is sent to the user interface 12 through the resource reservations system 13 (block 30). If the net revenue exceeds the summation of the marginal values (block 28), but one or more irreconcilable conflicts exist with the profiles or with resource availability, the system will send a counter-offer to the user interface 12 through the resource reservations system 13 (block 31).

F. Data Structures

FIG. 6 shows the data structures used by the yield management system 16. Three major data structures are used: a resource list 32, a composite resource list 33 and a demand records list 34.

The data structure for the resource list 32 comprises resource records 35 containing fields for storing a resource number 36, resource network number 37, resource type 38, resource description 39 and marginal value 40 and quantity 41. The data structure for the composite resource list 33 comprises composite resource records 42 containing fields for storing a composite resource number 43, a resource network number 37, a composite resource description 44 and for identifying the resources that comprise the composite resource, their start time and their duration ($45^{1a}$–$45^{nc}$). A further example of a commercial application functioning as a resource list 32 and composite resource list 33 (referred to as a project) is the desktop project management product licensed under the trademark of Microsoft Project™ manufactured by Microsoft Corporation, Redmond, Wash. Microsoft Project™ is a trademark owned by Microsoft Corporation. The data structure for the demand records list 34 comprises demand records 46 containing fields for storing a composite resource number 43, a resource network number 37, a beginning time interval number 47, an ending time interval number 48, a transaction price 49, a demand mean 50 and a demand variance 51.

Referencable by the resource list 32, the composite resource list 33 and the demand records list 34 is the data structure for a conventional schedule, the visual representation for which is described at User interface and Resource network reservation system (above). For simplicity, the data structures for this list is not shown in FIG. 6.

Referencable by the resource list 32, and the composite resource list 33 are the data structures for at least one profile data table, with information corresponding to the resource number 36, resource network number 37, resource type 38 or composite resource number 43. For simplicity, the data structures for these lists are not shown in FIG. 6.

Each composite resource in the resource network 8 is divided into its resources stored in the resource list 32. The resource number 36 field uniquely identifies each resource in the resource list 32 and is used to schedule specific resources comprising a composite resource. The resource network number 37 field identifies each resource as belonging to a specified resource network 8, and, together with the resource type 38 field, links the resource list 32 to the composite resource list 33. The resource type 38 field refers to the categorization of the resource as belonging to a class of resources and of having a profile data structure of a specified format. The resource description 39 field textually describes the resource. The marginal value 40 and capacity 41 fields store the marginal value and transaction capacity for the resource. For convenience, the resource records 36 will be referenced whenever a resource is referred to hereinbelow.

The data structure for the composite resource list 33 is comprised of composite resource records 42 and stores all of the potential transactions executable by a resource network 8. The composite resource number 43 field uniquely identifies each composite resource in the composite resource list. The resource network number 37 field identifies each composite resource as belonging to a specified resource network 8, and, together with the resource network number 37 field, links the composite resource list 33 to the demand records list 34. The composite resource description 44 field textually describes the resource. Three resource workflow fields, the workflow resource number ($45^{1a}$,$45^{2a}$ and $45^{na}$) field, the workflow resource start time ($45^{1b}$, $45^{2b}$ and $45^{nb}$) field and the workflow resource duration ($45^{1c}$, $45^{2c}$ and $45^{nc}$) field store the data required to provide for the coordination of multiple resources in executing a transaction, although further workflow fields are feasible. For convenience, the composite resource records 42 will be referenced whenever a composite resource is referred to hereinbelow.

The data structure for the demand records list 34 is comprised of demand records 46 and stores the different transaction and statistical parameters from the demand forecast for the corresponding composite resource. The composite resource number 43 links each demand record to a specific composite resource in the composite resource list 33. Two fields, the demand period start time 47 field and demand period end time 46 field retain temporal information concerning the transaction history, although additional temporal and other information is feasible. The transaction prices are stored in the transaction price 49 field in decreasing order. Two statistical parameters, mean and variance, are stored in the mean 50 and variance 51 fields, although further statistical parameters are feasible. Each composite resource record 42 points to one demand records list 34 which contains as many demand records 46 for as many transactions as required. For convenience, the transaction price 49 field will be referenced whenever a particular transaction price is referred to hereinbelow.

For simplicity, various additional data structures have been excluded from FIG. 6. Specific instances, by way of example, of these structures include data fields necessary to consider the resource location of a resource, data fields necessary to consider multiple resource types for a single resource, data fields necessary to treat a resource as both an individual resource and a member of a resource group and data fields necessary to treat a resource as belonging to more than one resource network. Generally these data structures are characterized by modifying what is inherently described in this application as a one-to-many data relationship into a many-to-many data relationship or in allowing a single demand record to be used in determining multiple demand functions.

G. Method for Determining Marginal Values

In the described embodiment, different optimization functions can be employed in determining marginal values for transactions involving the resources based on assumptions that the supply and demand are either deterministic or non-deterministic. It is critical that the optimization function employed generate a continuous demand curve, preferably as a function of marginal value (expressed in units, typically dollars) and supply (expressed in transaction service capacity). Two optimization functions, a supply-demand balance and an expected marginal resource revenue (EMRR), are described herein; however, other optimization functions are feasible depending upon the characteristics of the particular embodiment, such as reservation patterns, marginal value updating frequency and events that trigger reoptimization.

Figure 7:
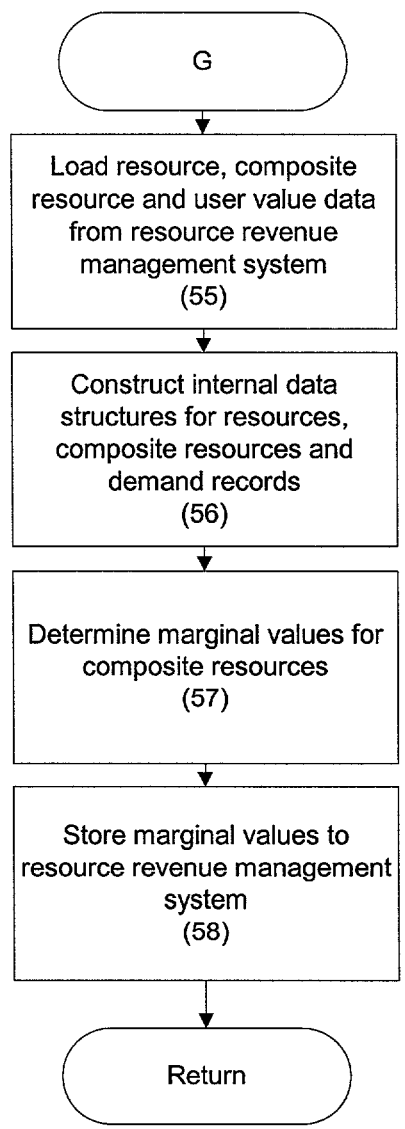
FIG. 7 is a flow diagram of a method for determining marginal values for use in the resource reservations system of FIG. 2.
Figure 8:
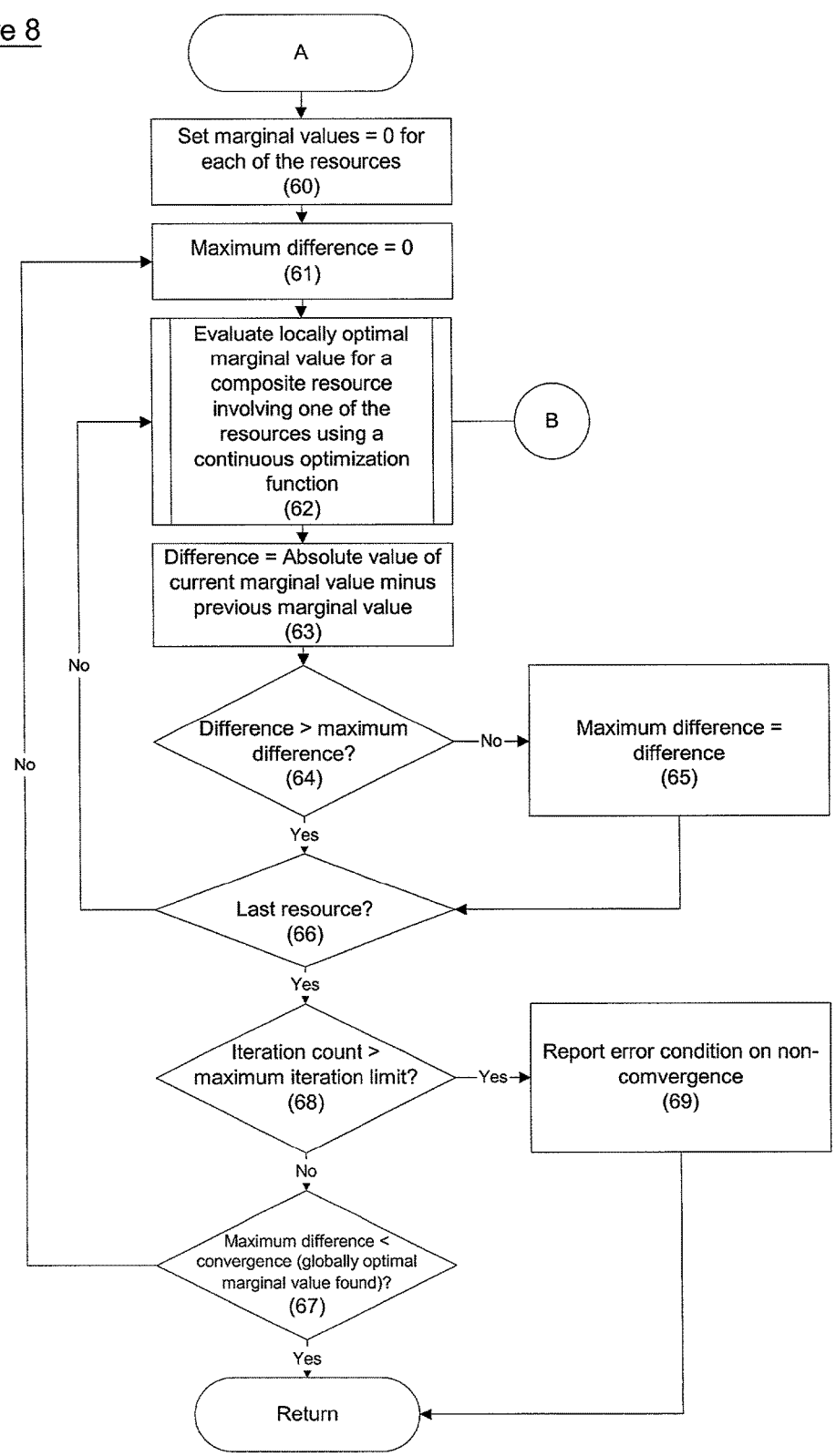
FIG. 8 is a flow diagram of an iterative function for determining marginal values for resources.

The basic control structure used to iteratively determine marginal values is identical regardless of the optimization function employed. This generic control structure is shown in FIGS. 7 and 8. A supply-demand balance optimization function is depicted in FIGS. 6 through 11B. An EMRR optimization function is depicted in FIGS. 12 through 15. The iterative section common to both optimization functions will now be described.

FIG. 7 is a flow diagram of a method using the YMS 16 for determining marginal values for use in the resource network reservations system 14 of FIG. 2. Information regarding resources, composite resources and passenger value data are loaded into the YMS 16 from the resource revenue management system 15 (block 55). The internal data structures shown in FIG. 6, including the resources list 32, the composite resource list 33 and the demand records list 34, are constructed for storing the received information (block 56). Marginal values 40 for each potential transaction involving the resources 35 are determined using an iterative function (block 57) as further described hereinbelow in FIG. 8. Upon completion of the iterative function, the marginal values are stored back to the resource revenue management system 15 (block 58).

FIG. 8 is a flow diagram of an iterative function (block 57) for determining marginal values 40 for the resources 35 as stored (block 56) in the data structures of FIG. 6. This function is structured as a pair of nested control loops that sequentially determine a marginal value 40 for each resource 35 using a Gauss-Seidel iterative approach. The resources 35 and the composite resources 42 are interdependent upon each other for purposes of marginal value determination. The outer control loop (blocks 61-67) repeats the determination of marginal values 40 for all of the resources 35 until a convergence criterion is satisfied. The inner control loop (blocks 62-66) sequentially determines a marginal value 40 for each of the resources 35.

The marginal value 40 for each of the resources 35 is initialized to 0 (block 60). A local variable $max_{diff}$ is set to 0 (block 61). This variable stores the largest difference between current versus previous marginal value 40 out of all marginal values 40 determined during the current iteration of the outer control loop (blocks 61-67) and is used to determine convergence. A locally optimal marginal value 40 is evaluated for a composite resource using one of the resources 35 using a continuous optimization function (block 62). In the described embodiment, two continuous optimization functions, supply-demand balance and EMRR, are used as further described hereinbelow in FIGS. 6-11 and FIGS. 12-15, respectively.

The continuous optimization function returns a marginal value 40 for a composite resource using the current resource 31. The magnitude of change in the locally optimal marginal value 40 (obtained in block 62) is determined (block 63) as expressed by the equation:

$$Diff = ABS(MV_i - MV_{i-1}) \quad (1)$$

where Diff is a local variable and $MV_i$ and $MV_{i-1}$ are the current and previous marginal values 40, respectively, for the current resource 31. Diff measures the absolute (represented by the ABS function) change which occurred between the current marginal value 40 as calculated during the present iteration of the outer control loop (blocks 61-67) versus the previous marginal values 40 as calculated during the previous iteration. If Diff is greater than $max_{diff}$ (block 64), $max_{diff}$ is set to Diff (block 65) since Diff reflects the biggest change in marginal value that has occurred up through this iteration of the inner control loop (blocks 62-66). Otherwise, $max_{diff}$ remains unchanged (block 64).

If other resources 35 remain (block 66), that is, must be evaluated for a locally optimal marginal value 34, control returns to the top of the inner control loop (block 62-66) for further processing. Otherwise, if the last resource has been evaluated (block 66), the inner control loop (block 62-66) is exited.

In the described embodiment, a convergence criterion is used in determining whether globally optimal marginal values 40 have been found. Consequently, the outer control loop (blocks 61-67) is performed for an indefinite number of iterations until the maximum difference (as stored in the local variable $max_{diff}$) between the current and previous marginal values 40 out of all of the resources 35 is less than the convergence criterion. In the described embodiment, the convergence criterion is expressed in decimal units, like 0.08 (corresponding to 0.08 units or 8 cents).

Thus, if $max_{diff}$ is less than convergence (block 67), control returns to the top of the outer control loop (block 61-67) for further processing. Otherwise, a globally optimal marginal value 40 has been obtained for each of the resources 35 (block 67) and the function returns.

A maximum iteration limit is used to prevent the function from running endlessly in the case of an error. If the iteration count exceeds the maximum iteration limit (block 68), the system will report the error condition of non-convergence (block 69) and return. In the described embodiment, a maximum iteration limit of 100 is suitable, although any other desired iteration limit could be used.

H. Supply-Demand Balance Optimization Function

Figure 9:
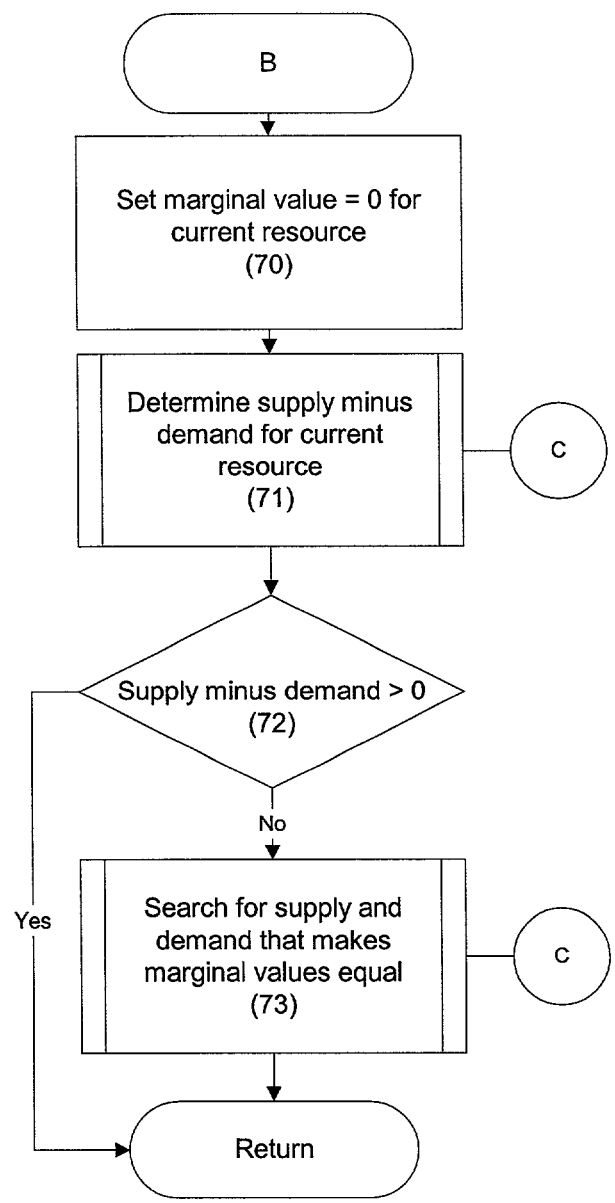
FIG. 9 is a flow diagram of a supply-demand balance optimization function used by the function of FIG. 8.

FIG. 9 is a flow diagram of a supply-demand balance optimization function (block 62) as used by the iterative function of FIG. 8. Its purpose is to find a locally optimal marginal value 40 based on the assumption that both the supply and the demand for composite resources is deterministic and that the optimal marginal value is that which substantially balances supply and demand.

Figure 11:
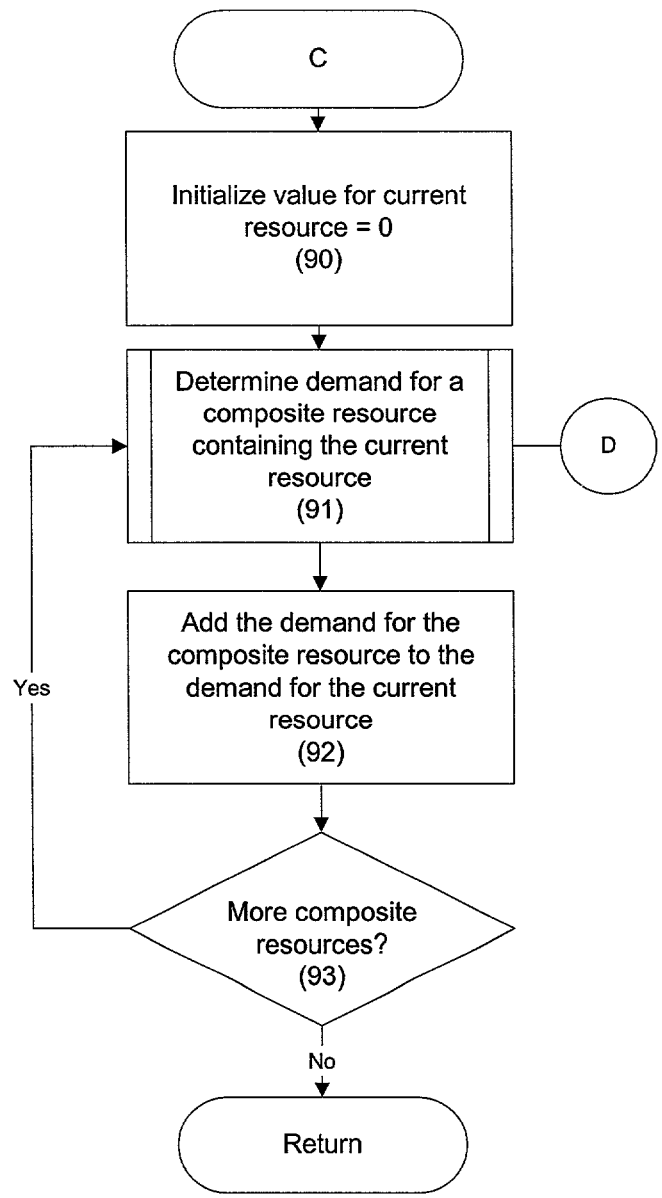
FIG. 11 is a flow diagram of a resource demand determination function.

The marginal value 40 for the current resource 35 is initialized to 0 (block 70). The demand for the current resource 35 is determined using a demand determination function that creates a demand curve as a function of marginal value 40 (shown in FIGS. 10A and 10B) as further described hereinbelow in FIG. 11. The difference between the supply of composite resources 42 available using the current resource 35 (where the resource type 38 of the current resources is included in the workflow resource number 45$^{na}$ field of the composite resource and is listed as available in the resource schedule) and the corresponding demand for composite resources using the current resource 35 (as returned by the determination function of FIG. 11) is determined (block 71). If the difference of supply minus demand is greater than 0 (block 72), there is more composite resource transaction capacity for composite resources using the current resource 35 than is demanded, that is, supply exceeds demand, and the marginal value 40 remains at 0. The function then returns. Otherwise, if the difference of supply minus demand is less than or equal to 0 (block 72), the demand determination function of FIG. 11 is repeatedly called and the difference between supply and demand taken until a marginal value 40 that makes supply and demand equal is found (block 73). The function then returns. The operation of this function will now be described with reference to FIGS. 10A and 10B, which show graphs of resource demand curves 81 and 85, respectively.

The graphs of FIGS. 10A and 10B illustrate the two cases selected by the decision block 72 of FIG. 9. The x-axis represents marginal values expressed in dollars and the y-axis represents composite resource transaction capacity for composite resources using the current resource 35. The composite resource transaction capacity for composite resources using the current resource 35 (as indicated by line 80 in FIG. 10A and by line 84 in FIG. 10B) is provided by the resource revenue management system 15 through the resource schedule parameters and is assumed for these graphs to be non-deterministic. The demand curve (as indicated by line 81 in FIG. 10A and by line 85 in FIG. 10B) is generated by the resource demand determination function of FIG. 11.

By way of example, assume that a marginal value 40 for the Room 3 resource 35 is being determined with The composite resource transaction capacity for composite resources using the current resource 35 for resource equaling 10 (i.e., there are 10 other resources having the resource type 38 equal to 101 for a defined geographic area, for example, Minneapolis/St. Paul). In FIG. 10A, the situation where the difference between supply minus demand is greater than 0 is shown. At point 79, the marginal value 40 equals 0, supply equals 10 and demand equals 8. Thus, the difference 82 between supply 80 and demand 81 equals 2 and is therefore greater than 0. This situation indicates that the supply exceeds the demand and any non-zero marginal value is therefore meaningless. In such cases, a marginal value 40 equaling 0 will be returned.

In FIG. 10B, the situation where the difference between supply minus demand is less than or equal to 0 is shown. At point 83, the marginal value 40 equals 0, supply equals 10 and demand equals 14. Thus, the difference 86 between supply 84 and demand 85 equals −4 and is therefore less than 0. This situation indicates that the demand exceeds the supply and a non-zero marginal value is required. Thus, the intersection 87 between supply 84 and demand 85 must be found. In the described embodiment, a Van Wijngaarden-Dekker-Brent search method, such as described in W. H. Press et al., Numerical Recipes in C—The Art of Scientific Computing, pp. 267-69, Cambridge University Press (1988), the disclosure of which is incorporated herein by reference, is employed to search the demand curve 85 (block 73) using the resource demand determination function of FIG. 11 as an input parameter along with the supply. This function is used to generate candidate demand points 88a, 88b along the demand curve 85 as the Van Wijngaarden-Dekker-Brent search method searches for the intersection 87. In effect, the search moves along the x-axis using a candidate marginal value 40 at each candidate demand point 88a, 88b and the demand for composite resources using the current resource 35 at each candidate demand point 88a, 88b is compared to the supply. Once the intersection 87 is found, the marginal value 34, here, equaling $225, is obtained as a point 89 along the x-axis.

FIG. 11 is a flow diagram of a resource demand determination function (blocks 71 and 73) as used by the supply-demand optimization function of FIG. 9. Its purpose is to generate the demand curve 81, 85 for the current resource 35 as a function of a candidate marginal value 34. The demand for the current resource 35 is initialized to 0 (block 90). The demand for a composite resource 42 containing the current resource 35 is determined by a composite resource demand determination function (block 91) as further described hereinbelow in FIG. 12. The value this function returns represents the demand for the composite resource 42 at the candidate marginal value 40 for the current resource 35 and the current marginal values 40 for all other resources 35 contained in the composite resource 42. The demand for composite resource 42 is added to the demand for the current resource 35 (block 92). If there are more composite resources 42 that contain the current resource 35 (block 93), the control loop (blocks 91-93) is repeated until all composite resources 42 that contain the current resource 35 have been processed. In effect, the control loop (blocks 91-93) follows every relationship between a resource record 35 and a composite resource record 42 in a one-to-many relationship. When no more composite resources 42 remain (block 93), the function returns.

Figure 12:
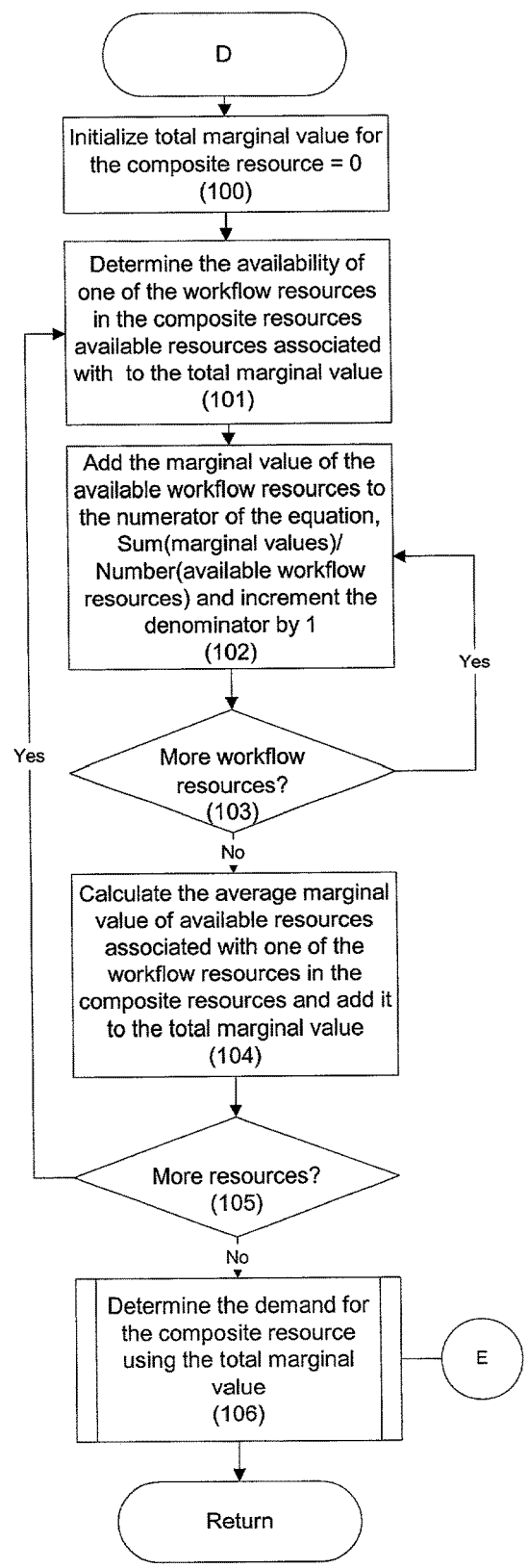
FIG. 12 is a flow diagram of a composite resource demand determination function.

FIG. 12 is a flow diagram of a composite resource demand determination function (block 91) as used by the function of FIG. 11. Its purpose is to determine the demand for the current composite resource 42 using the total of the marginal values 40 of the resources 35 contained in the composite resource 42. The total marginal value for the current composite resource 42 is initialized to 0 (block 100). The marginal value 40 of available resources associated with one of the workflow resources 45$^{na}$ contained in the current composite resource 42 is added to the numerator of a marginal value calculation, with the denominator being increased by one of each available resource (blocks 101-103). The average marginal value 40 of available resources associated with one of the workflow resources 45$^{na}$ contained in the current composite resource 42 is added to the total marginal value (block 104). If other resources 35 contained in the composite resource 42 remain (block 105), control returns to the top of the control loop (blocks 101-105). In effect, the control loop (blocks 101-105) follows every relationship, expressed by the workflow resource number 45$^{na}$ field, between a composite resource record 42 and a resource record 35 in a one-to-many relationship. When the average marginal values 40 for all of the resources 35 contained in the composite resource 42 have been added to the total marginal value (block 105), the demand for the composite resource 42 is determined by a composite resource demand search function (block 106) using the total marginal value as further described hereinbelow in FIG. 13. The function then returns.

Figure 13:
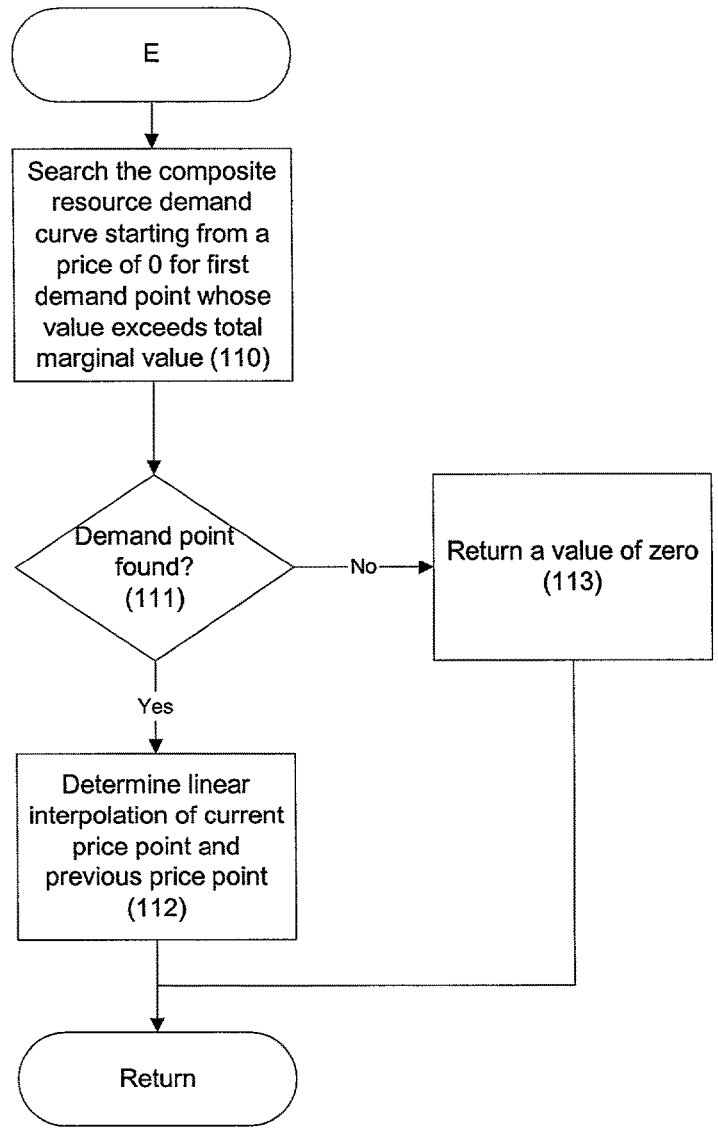
FIG. 13 is a flow diagram of a composite resource demand search function.

FIG. 13 is a flow diagram of the composite resource search function (block 106) used by the function of FIG. 12. Its purpose is to find points on a composite resource demand curve 121 (shown in FIG. 14A) that bracket the supply and to perform a linear interpolation of the demand curve 121 for the composite resource 42 as a function of the total marginal value. The search and linear interpolation will be explained with reference to FIG. 14A, which shows a graph of the composite resource demand curve 12. This curve is represented by an additional data structure (not shown) used by the supply-demand balance optimization function (shown in FIG. 9) and is created during the construction of the internal data structures in block 56 of FIG. 7.

Figure 14A:
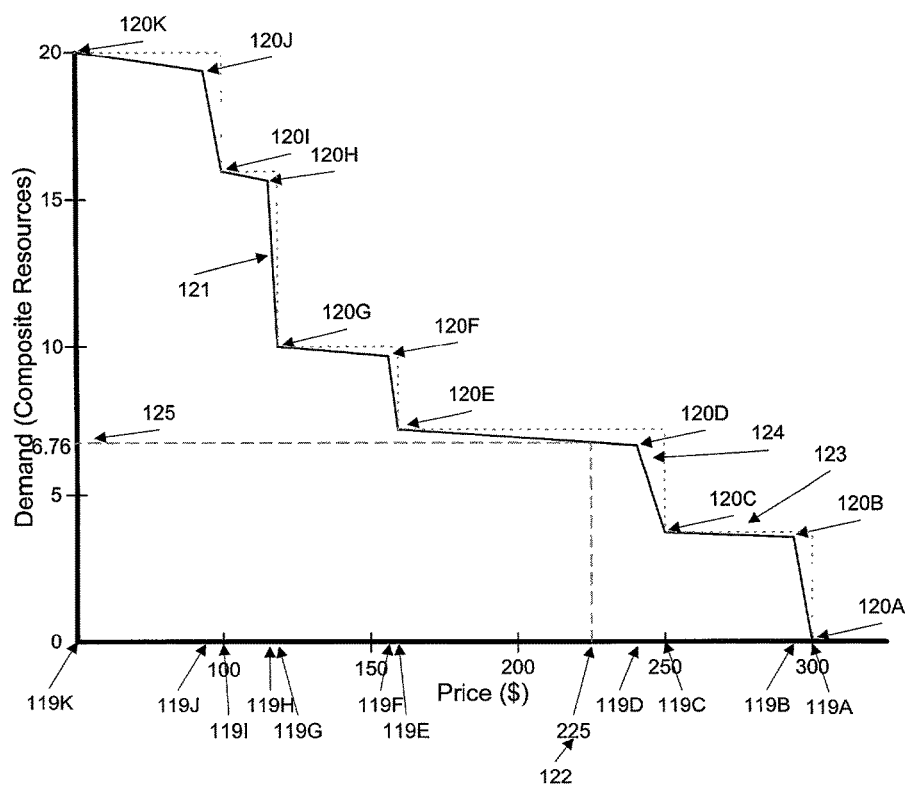
FIG. 14A shows a graph of a composite resource demand curve used by the search function of FIG. 13.

In the graph of FIG. 14A, the x-axis represents the price of the current composite resource 42 expressed in dollars and the y-axis represents the demand expressed in composite resource transaction capacity for composite resources using the current resource. Each composite resource record 42 points to an associated composite resource demand curve 121 which is constructed from the demand record list 34.

The construction, by way of example, of the composite resource demand curve 121 is accomplished by the following procedure. It is critically important that the demand curve 121 be continuous as guaranteed by the following procedure. Starting with the first demand record 46 on the demand record list 34, that is, with the demand record 46 storing the highest transaction price 49, points of the form (price, demand) are added to the demand curve list 38. The first point in the example is:

$$(BCP_1, 0)$$

where $BCP_1$ is the transaction price 49 of the first demand record 46. Points are inserted onto the demand curve 121 of the form:

$$(BCP_1, cumulative_{mean}) \quad (2)$$

where $BCP_1$ is the transaction price 49 of the successive demand records i and $cumulative_{mean}$ is the accumulation of the mean demand 50 using the formula:

$$cumulative_{mean+} = mean_{i-1} \quad (3)$$

where $mean_{i-1}$ is the mean demand of the demand record 46 before i. After reading the last demand record 46, one more point is added:

$$(0, cumulative_{mean})$$

where $cumulative_{mean}$ includes the mean demand of the last demand record 46 in the demand record list 34.

Once the demand curve 121 is constructed from points in the demand record list 140, additional points are inserted between each of the existing points in the demand curve 121. The form of the inserted point is:

$$(price_1, demands_i) \quad (4)$$

where $price_1$ and $demand_i$ are given by the formulas:

$$price_1 = price_{i+1} + (price.sub_{i-1} - price_{i+1}) \times IF \quad (5)$$

and $$demand_1 = demand_{i-1} + (demand_{i+1} - demand_{i-1}) \times IF \quad (6)$$

where $price_{i+1}$ and $demand_{i+1}$ are the price and demand of the point on the demand curve following the inserted point and $price_{i-1}$ and $demand_{i-1}$ are the price and demand of the point on the demand curve preceding the inserted point. IF is a parameter called the interpolation factor. In the described embodiment, the value of the interpolation factor is 0.9, but any other value greater than 0.5 and less than 1.0 could be used depending on the needs of the application.

FIG. 14B is a table showing, by way of example, the results of the demand curve construction using the demand records 46 (shown in FIG. 6). The odd numbered points (120a, 120c, 120e, 120g, 120i, 120k) were inserted using formula (2). For example, point 120e has a price of $160 which comes from the third demand record 46 in the demand record list 34 (having a transaction price 49 of $160) and a demand of 4+3=7 which is the accumulated demand of the first two demand records 39 in the demand record list 34. The even numbered points (120b, 120d, 120f, 120h, 120j) were calculated with formulas (4), (5) and (6). For example, point 120d is calculated as follows $$price_{120d} = 160 + ((250-160) \times 0.9) = 241.0$$

and $$demand_{120d} = 4 + ((7-4) \times 0.9) = 6.7$$

The points 120a, 120b, 120c, 120d, 120e, 120f, 120g, 120h, 120i, 120j, 120k in FIG. 14B are graphed as shown in FIG. 14A. The prices are shown on the x-axis and are labeled 119a, 119b, 119c, 119d, 119e, 119f, 119g, 119h, 119i, 119j, 119k.

The graph of FIG. 14A also illustrates the search and linear interpolation of the composite resource demand curve 121 performed by the composite resource search function of FIG. 13. The formula for interpolated demand is:

$$\text{Interpolated Demand} = demand_{i-1} \times ((TMV - price_1)/(price_{i-1} - price_1)) + demand_i \times ((price_{i-1} - TMV)/(price_{i-1} - price_i))$$

where $price_i$ and $demand_i$ are the price and demand of the point with a price greater than the total marginal value, TMV, and $price_{i-1}$ and $demand_{i-1}$ are the price and demand of the point with a price less than or equal to TMV.

The function depicted in FIG. 13 starts with a search starting from 0 for the first demand point with a price greater than the total marginal value (blocks 110). If no such demand point is found (block 111), the function terminates and returns a value of 0 (113). FIG. 14A shows, by way of example, a total marginal value equaling $225, as indicated at point 122. The first point with a price greater than $225 is (241, 6.7). The point (241, 6.7) and the previous point (160, 7.0) are interpolated (block 112) by applying formula (5) as follows:

$$6.7 \times ((225-160)/(241-160)) + 7.0 \times ((241-225)/(241-160)) = 6.76$$

The interpolation is shown graphically as the intersection point 124 of the line 123 and the total marginal value 122 between the points 120d and 120e. The resulting demand value 125 is calculated and the function returns.

I. Expected Marginal Resource Revenue (EMRR) Optimization Function

Figure 15:
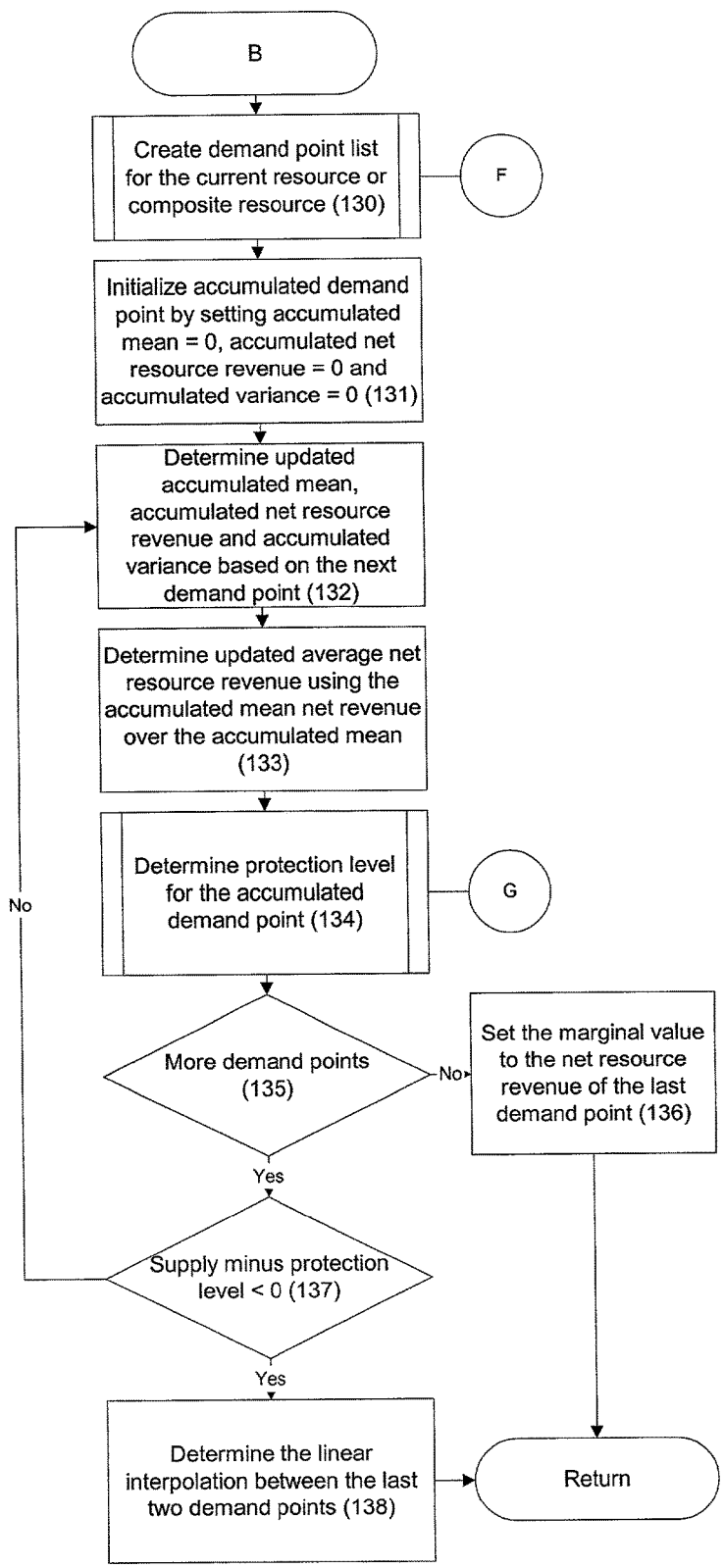
FIG. 15 is a flow diagram of an expected marginal resource revenue (EMRR) optimization function used by the function of FIG. 5.

FIG. 15 is a flow diagram of an EMRR optimization function (block 62) as alternatively used by the iterative function of FIG. 8. Its purpose is to find a locally optimal marginal value 40 based on the assumption that the demand for composite resources is uncertain, that is, non-deterministic. This assumption is commonly used in leg-based airline yield management systems, such as described in P. Belobaba, Application of a Probabilistic Decision Model to Airline Seat Management Control, 37 Operations Research, pp. 183-97 (1989) and R. D. Wollmer, An Airline Seat Management Model for a Single Leg Route When Lower Fare Classes Book First, 40 Operations Research, pp. 26-37 (1992), the subject matters of which are incorporated herein by reference.

The EMRR approach uses values known as protection levels in a similar way that demand is used in the supply-demand balance function. The EMRR method also uses a new data structure called a demand point list 140 (shown in FIG. 17B) and the concept of an accumulated demand point which will be described in the discussion of FIG. 15. The EMRR optimization function (shown in FIG. 15) will now be described.

A demand point list 140 (shown in FIG. 17B) is created for the current resource 35 using a function (block 130) further described hereinbelow in FIG. 17A.

An accumulated demand point is initialized in block 131. An accumulated demand point consists of six local variables: accumulated mean 152, accumulated net resource revenue 153, accumulated variance 154, average net resource revenue 155, protection level 156 and next net resource revenue 157, several values of which are shown in FIG. 17C. The accumulated demand point is initialized by setting the accumulated mean 152, accumulated net resource revenue 153 and accumulated variance 154 to 0 (block 131). These variables are used for storing accumulated totals derived from the demand points in the demand point list 140 for the current resource 30. The average net resource revenue 155 and the protection level 156 are also initialized to 0. The initial value of the next net resource revenue 157 is set to the value of the net resource revenue 142 of the first demand point 141a in the demand point list 140.

Figure 16:
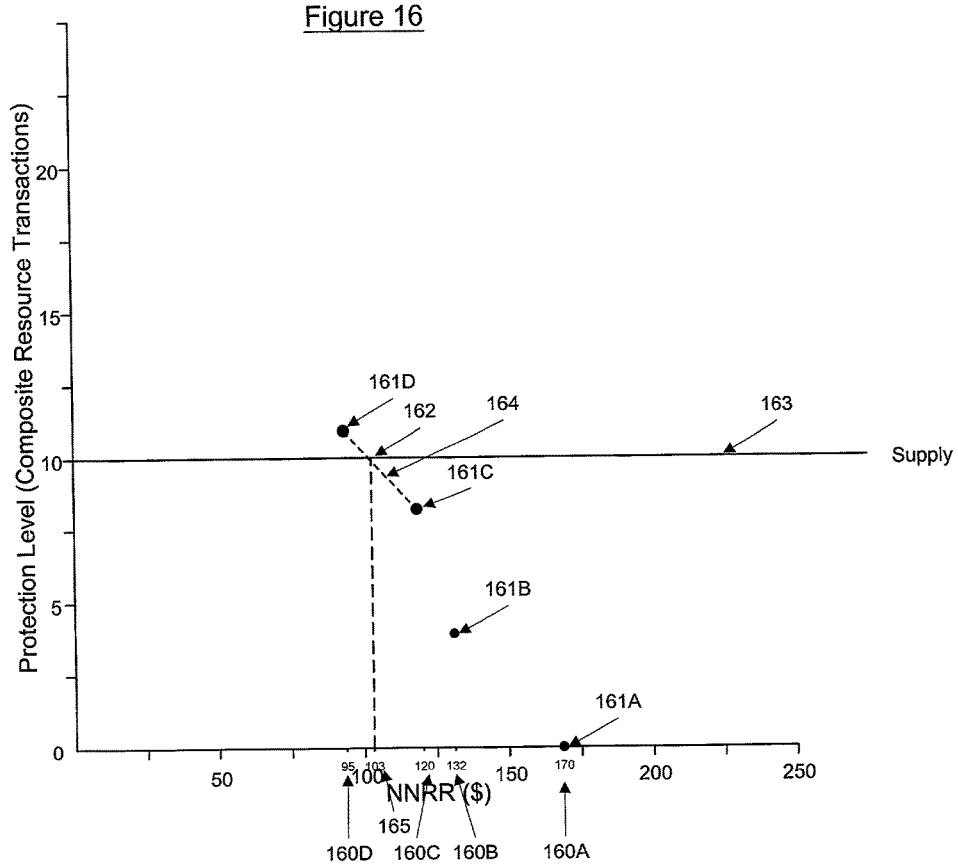
FIG. 16 shows a graph of a resource protection level curve generated by the EMRR optimization function of FIG. 15.

The first accumulated demand point 161a is plotted on the graph shown in FIG. 16 using the next net resource revenue 157 on the x-axis and the protection level 156 on the y-axis. The remaining accumulated demand points 161b, 161c, 161d are iteratively determined using a control loop (blocks 132-137) that sequentially processes each demand point in the demand point list 140 starting with the point with the highest average net resource revenue 142. During each successive iteration of the control loop (blocks 132-137), the accumulated mean 152, accumulated net resource revenue 153 and accumulated variance are updated (block 132) based on the next demand point in the demand point list 140. The updated accumulated mean 152 is determined as expressed by the equation:

$$\text{accumulated}_{mean+} = \text{mean}_i \quad (8)$$

where $\text{mean}_1$ is the mean 143 for the next demand point in the demand point list 140. The updated accumulated net resource revenue (NRR) 153 is determined as expressed by the equation:

$$\text{accumulated}_{NRR+} = NRR_i \times \text{mean}_i \quad (9)$$

where $NRR_i$ is the net resource revenue 142 and $\text{mean}_i$ is the mean 143 for the next demand point in the demand point list 140. The updated accumulated variance is determined as expressed by the equation:

$$\text{accumulated}_{variance+} = \text{var}_i \quad (10)$$

where $\text{var}_i$ is the variance 144 for the next demand point in the demand point list 140.

The average net resource revenue (NRR) 155 is determined by dividing the accumulated net resource revenue 153 by the accumulated mean 152 (block 132) as expressed by the equation:

$$\text{Average}_{NRR} = \text{accumulated}_{NRR}/\text{accumulated}_{mean}$$

where $\text{accumulated}_{mean}$ an was calculated in equation (8) and $\text{accumulated}_{NRR}$ was calculated in equation (9). This value represents a weighted average of the net resource revenues 142 for each demand point from the top of the demand point list 140 up through the current demand point. A protection level 156 is determined for the accumulated demand point using a function (block 134) further described hereinbelow in FIG. 18. Finally, the value of the next net resource revenue 157 is set to the value of the net resource revenue 142 of the next demand point in the demand point list 140. If there are no more demand points in the demand point list 140, the value of the next net resource revenue 157 is set to 0. If all of the demand points in the demand point list 140 have been processed (block 135), the marginal value 40 is set to the net resource revenue 142 of the last demand point in the demand point list 140 (block 136) and the function returns. Otherwise, if more demand points remain (block 135) and the difference of supply minus protection level 155 is greater than 0 (block 137), control continues at the top of the control loop (blocks 132-137) for processing of the next demand point.

Otherwise, if the difference of supply minus protection level 156 is less than or equal to 0 (block 137), the marginal value 40 is determined by using linear interpolation between the last two accumulated demand points (block 138) as expressed by the equation:

$$NNRR_{i-1} \times ((Pl_i - \text{supply})/(Pl_i - Pl_{i-1})) + NNRR_i \times ((\text{supply} - Pl_{i-1})/(Pl_i - Pl_{i-1})) = MV$$

where $NNRR_i$ and $NNRR_{i-1}$ are the next net leg revenues 157 of the last two accumulated demand points, supply is the supply of composite resources 42, $Pl_i$ and $Pl_{i-1}$ are the protection levels 156 for the last two accumulated demand points and MV is the marginal value 40.

The linear interpolation will be explained with reference to FIG. 16, which shows a graph of a resource protection level curve generated by the function of FIG. 15. The x-axis represents the next net resource revenue 157 expressed in dollars and the y-axis represents the protection level 156 expressed in composite resource transactions. Accumulated demand points 161a, 161b, 161c, 161d, are graphed as a function of their respective next net resource revenue 157 points 160a, 160b, 160c, 160d.

By way of example, assume that a marginal value 40 for the Doctor A resource 35 is being determined with a supply of resources 35 possessing the same resource type 38 (in this case, resources, like Doctor A, possessing resource type, 243, capable of performing Procedure 119) equaling 10. Protection levels are calculated as illustrated, by way of example, in the table of FIG. 17C. Each row 151a, 151b, 151c, 151d corresponds to an accumulated demand point as determined during each successive iteration of the control loop (blocks 132-137). Each column corresponds to an accumulated mean 152, accumulated net resource revenue 153, accumulated variance 154, average net resource revenue 155, protection level 156 and next net resource revenue 157. Row 151a represents the initialized value of the accumulated demand point. Row 151b represents values determined during the first iteration of the control loop (block 132-137), row 151c during the second iteration and row 151d during the third iteration.

Using row 151c as an example, the accumulated mean 152 is calculated using equation (8) as follows:

$$4+4=8$$

The accumulated net resource revenue 153 is calculated using equation (9) as follows:

$$(170 \times 4)+(132 \times 4)=1208$$

The accumulated variance 154 is calculated using equation (10) as follows:

$$1208/8=151$$

$$2+3=5$$

The average net resource revenue 155 is calculated using equation (11) as follows:

The protection level 156 is determined by a function (block 134) which is described further hereinbelow in FIG. 18. The next net resource revenue 157 is 265 which is the value of the net resource revenue 142 of the third demand point 141C on the demand point list 40. In this example, the result of the protection level calculation is 7.

Starting from the first accumulated demand point 151a, protection levels 156 are calculated and compared to supply. The first accumulated demand point 151a has a protection level 156 of 0, which is less than the supply of 10. This first point is plotted as point 161a in the graph of FIG. 16. The second accumulated demand point 151b has a protection level 156 of 4 which is also less than the supply of 10. This second point is plotted as point 161b in the graph of FIG. 16. The third accumulated demand point 151c has a protection level 156 of 8 which is also less than the supply of 10. This third point is plotted in the graph of FIG. 16 as point 161c. The fourth accumulated demand point 151d has a protection level 156 of 11 which is larger than the supply of 10 which is the first demand point at which the difference of supply minus protection level 156 is less than 0 (block 137). The difference of supply minus protection level 156 is 10−11=−1. Since −1 is less than 0 (block 137), an interpolated marginal value 40 is determined between the accumulated demand points 161c and 161d by equation (12) as follows:

$$\$120\times((11-10)/(11-8))+\$95\times((10-8)/(11-8))=\$103$$

Thus, the marginal value 33 is $103. The intersection 162 between the supply (as indicated by line 163) and the interpolated demand (as indicated by line 164) falls at the point 165 on the x-axis where NNRR equals 103, the interpolated marginal value 34. Once this marginal value has been found (using equation (12)), the function returns.

Figure 17A:
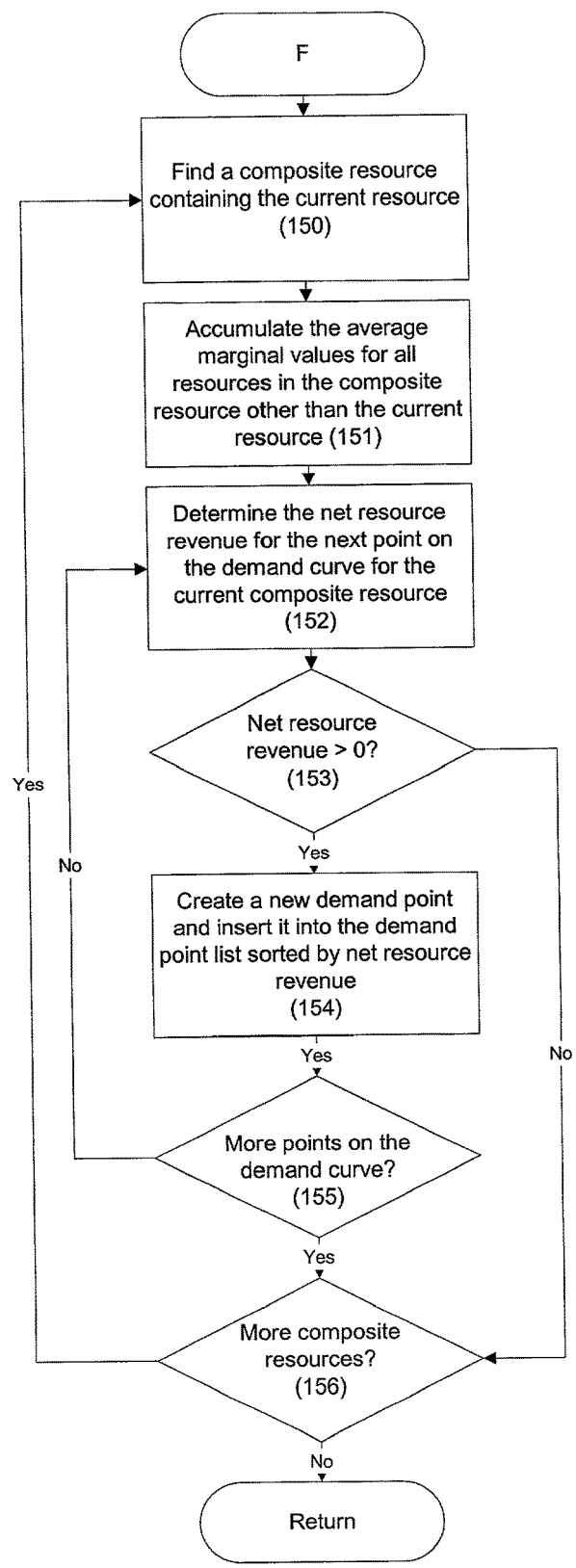
FIG. 17A is a flow diagram of a demand point list creation function.

FIG. 17A is a flow diagram of a demand point list creation function (block 130) as used by the function of FIG. 15. A composite resource 42 containing the current resource 35 is found by using the links from the composite resources 42 to the resources 35 (shown in FIG. 6). The marginal values 40 for all of the resources 35 contained in the composite resource 42 except the current resource 35 are accumulated into a temporary local variable (block 151) as expressed by the equation:

$$\Sigma MV_j \quad (13)$$

where $MV_j$ is the marginal value 40 for a resource 35 contained in the composite resource 42 except the current resource 31.

When a marginal value for a particular resource 35 is being determined, the EMRR optimization function takes the net revenue, that is, reservation price 49, and subtracts off the marginal values for all other resources 35 occurring in the current composite resource 42 to obtain the net resource revenue 142 for the particular resource 35 being optimized. The net resource revenue 142 for the next point on the demand curve for the current resource 35 is determined (block 152) as expressed by the equation:

$$BCP_i \text{-} \Sigma MV_j \quad (14)$$

where $BCP_i$ is the transaction price 49 for the current composite resource 42 and $MV_j$ is the marginal value 40 for a resource 35 contained in the composite resource 42 except the current resource 31. The net resource revenue 142 is stored in the demand point list 140 as further described hereinbelow.

Figure 17B:
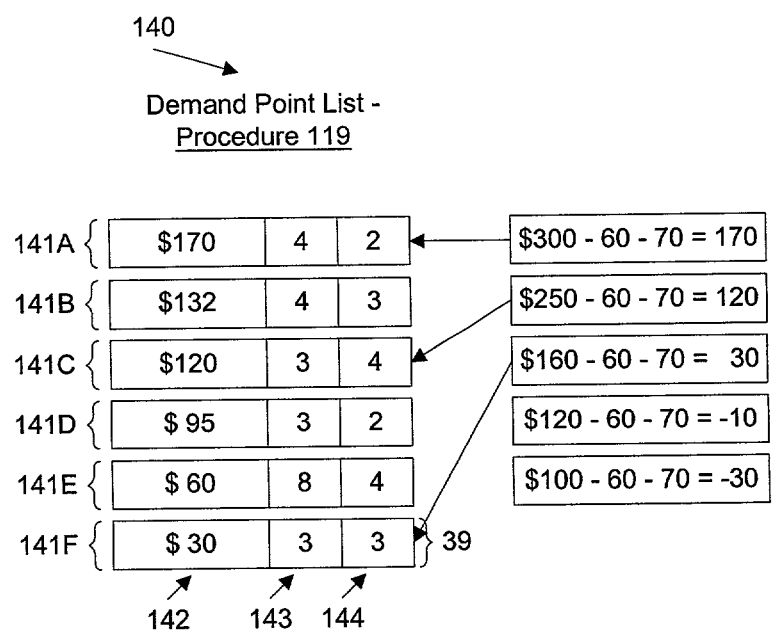
FIG. 17B is a data structure used by the EMRR optimization function of FIG. 12.

If the net resource revenue 142 is greater than 0 (block 153), a new demand point is created and inserted into the demand point list 140 which is sorted in decreasing net resource revenue order (block 154). For example, demand points for reservation prices 40 of $300,250 and 160 are shown in FIG. 17B as having been inserted into the demand point list 140. Otherwise, if the net resource revenue is less than 0 (block 153), the current iteration over the points on the demand curve is terminated since any further points would also have net resource revenues less than 0. For example, demand points for reservation prices 49 of $120 and $100 will not be inserted into the demand point list 140.

If the net resource revenue is still greater than 0 and more demand points corresponding to reservation prices 49 remain (block 155), control returns to the top of the inner control loop (block 152-155) for processing of the next demand point. Otherwise, if no further demand points remain (block 155) and more composite resources 36 remain (block 156), control returns to the top of the outer control loop (blocks 150-156) for processing of the next composite resource 36. This process will continue to add points to the demand point list 140. If all composite resources have been processed (block 156), the function returns.

FIG. 17B is a data structure for a demand point list 140 as generated by the demand point list creation function of FIG. 17A. One demand point list 140 is created for each resource 35 that is to be optimized. The data structure for the demand point list 140 comprises demand point records 141a, 141b, 141c, 141d, 141e, 141f containing net resource revenue 142, mean 143 and variance 144 fields. The net resource revenue 142 field stores the net resource revenue for the demand point corresponding to a transaction price 49 as calculated with equation (14) (block 152). The mean 50 and variance 51 for each demand record 46 are copied into the demand point list 140 as mean 143 and variance 144, respectively. For convenience, the net resource revenue 142 field will be referenced whenever a particular net resource revenue is referred to hereinbelow.

FIG. 17B shows, by way of example, a demand point list 140 for the Doctor A resource 35. The first entry in this list, entry 141a, corresponds to the first demand record 46 in the demand records list 34 for the composite resource 10 (Room 3, Doctor A, Microscope A) as shown in FIG. 6. The first demand point encountered in the associated set of demand records 39 corresponds to the transaction price 49 of $300. Using equation (14), the net resource revenue 142 is:

$$BCP_1\text{-}MV_{Room\ 3}\text{-}MV_{Microscope\ A} = \$300\text{-}\$60\text{-}\$70 = \$170$$

where $BCP_1$ is the first transaction price 49 of $300 for the (Room 3, Doctor A, Microscope A) composite resource 42 and $MV_{Room\ 3}$ and $MV_{Microscope\ A}$ are the marginal values 40 for the Room 3 and Microscope A resources 35, respectively. Entries 141c and 141f are also taken from the composite resource 10 (Room 3, Doctor A, Microscope A) as shown in FIG. 17B. The other entries in the demand point list 140, entries 141b, 141d, 141e, are taken from other composite resources containing the Doctor A resource 10 The net resource revenue 142 value of $170 is stored in the demand point record 141a. Similar calculations apply to the remaining demand point records 141b, 141c, 141d, 141e.

Figure 18:
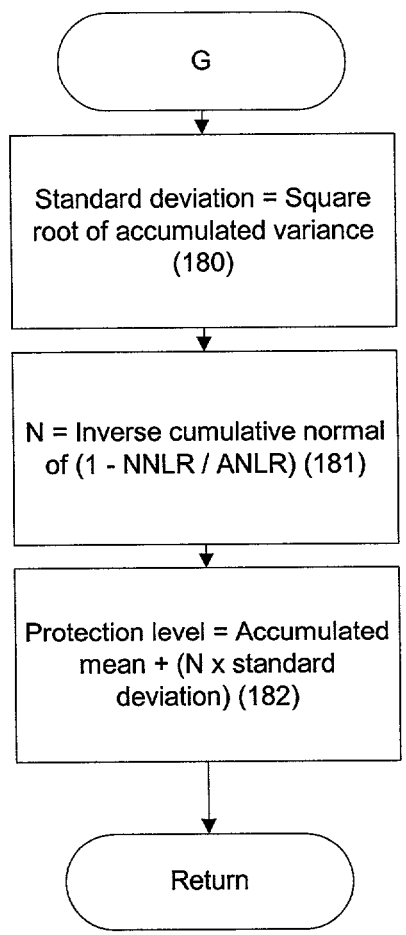
FIG. 18 is a flow diagram of a protection level determination function.

FIG. 18 is a flow diagram of a protection level determination function (block 134) as used by the function of FIG. 15. Its purpose is to determine a protection level 156 for the current resource 35 being optimized as a function of the accumulated demand point. The square root of the accumulated variance 154 is taken and stored in a local variable $std_{dev}$ (block 180). The cumulative inverse normal of:

$$(1-NNRR/ANRR)$$

is determined and stored in a local variable N (block 181). ANRR is the average net resource revenue 155 and NNRR is the next net resource revenue 157 of the accumulated demand point. In the described embodiment, the cumulative inverse normal is calculated using a numerical approximation, such as described in C. Hastings, Approximations for Digital Computers, p. 192, Princeton University Press (1955), the disclosure of which is incorporated herein by reference. The protection level 156 is determined (block 182) as expressed by the equation:

$$PL = M + N \times std_{dev} \quad (15)$$

where M is the accumulated mean 152 of the accumulated demand point and N and $std_{dev}$ are defined as described above. The function then returns.

J. Additional Yield Management Systems

Additionally, in the described embodiment, the YMS 16 is an exemplary example of a yield management approach. Other suitable approaches are described in detail by S. Kimes in "Yield Management: A Tool for Capacity-Constrained Service Firms." Journal of Operations Management 8, no. 4 (1989): 363, disclosure of which is incorporated herein by reference. Each of these approaches constitutes another embodiment of the present invention.

A further embodiment of the present invention is a computer-based method for yield management using a mathematical programming solution technique for determining transaction values for human-factor resources expiring at a future time.

A further embodiment of the present invention is a computer-based method for yield management using an economics-based solution technique for determining transaction values for human-factor resources expiring at a future time.

A further embodiment of the present invention is a computer-based method for yield management using a threshold curve solution technique for determining transaction values for human-factor resources expiring at a future time.

A further embodiment of the present invention is a computer-based method for yield management using an expert system solution technique for determining transaction values for human-factor resources expiring at a future time.

A further embodiment of the present invention is a computer-based method for yield management using a haphazard non-peak price discount system solution technique for determining transaction values for human-factor resources expiring at a future time. Price brackets are created based on specified composite resource transaction parameters.

A further embodiment of the present invention is a computer-based method for yield management using a combination of two or more of a mathematical programming solution, and economics-based solution, a threshold curve solution, an expert system or a haphazard non-peak price discount system solution technique for determining transaction values for human-factor resources expiring at a future time. Price brackets are created based on specified composite resource transaction parameters.

A further embodiment of an yield management system operable either as a YMS 16 within a transaction reservation system 11 or outside of a transaction reservation system is a resource network-determined haphazard transaction parameter adjustment system (a form of expert system) for determining transaction values for human-factor resources expiring at a future time. Such systems haphazardly change the transaction parameters to better match the supply of a composite resource with its expected demand. Below are examples (representative only) of such systems:

Example 1—Composite Resource: Haircut

| | |
|---|---|
| 9:00 a.m.–10:59 a.m. | $9 |
| 11:00 a.m.–12:59 p.m. | 10 |
| 1:00 p.m.–3:29 p.m. | 9 |
| 3:30 p.m.–6:29 p.m. | 12 |
| 6:30 p.m.–8:59 p.m. | 10 |

Example 2—Composite Resource: Haircut

| | |
|---|---|
| 9:00 a.m.–10:59 a.m. | $1 discount |
| 11:00 a.m.–12:59 p.m. | 0 |
| 1:00 p.m.–3:29 p.m. | 1 discount |
| 3:30 p.m.–6:29 p.m. | 2 premium |
| 6:30 p.m.–8:59 p.m. | 0 |

Example 3—Composite Resource: Haircut

| | |
|---|---|
| 9:00 a.m.–10:59 a.m. | 10% discount |
| 11:00 a.m.–12:59 p.m. | 0 |
| 1:00 p.m.–3:29 p.m. | 10% discount |
| 3:30 p.m.–6:29 p.m. | 20% premium |
| 6:30 p.m.–8:59 p.m. | 0 |

Example 4—Composite Resource: Haircut

| | |
|---|---|
| 9:00 a.m.–10:59 a.m. | $1 coupon off next appointment |
| 11:00 a.m.–12:59 p.m. | 0 |
| 1:00 p.m.–3:29 p.m. | 1 coupon off next appointment |
| 3:30 p.m.–6:29 p.m. | 0 |
| 6:30 p.m.–8:59 p.m. | 0 |

Example 5—Composite Resource: Haircut

| | |
|---|---|
| 9:00 a.m.–10:59 a.m. | 10% rebate |
| 11:00 a.m.–12:59 p.m. | 0 |
| 1:00 p.m.–3:29 p.m. | 10% rebate |
| 3:30 p.m.–6:29 p.m. | 20% surcharge |
| 6:30 p.m.–8:59 p.m. | 0 |

Example 6—Composite Resource: Haircut

| | |
|---|---|
| 9:00 a.m.–10:59 a.m. | $10, plus 1,000 awards points |
| 11:00 a.m.–12:59 p.m. | 10 |
| 1:00 p.m.–3:29 p.m. | 10, plus 1,000 awards points |
| 3:30 p.m.–6:29 p.m. | 10 |
| 6:30 p.m.–8:59 p.m. | 10 |

Example 7—Composite Resource: Massage

| | |
|---|---|
| 9:00 a.m.–10:59 a.m. | $30 for 45 minutes |
| 11:00 a.m.–12:59 p.m. | 30 for 30 minutes |
| 1:00 p.m.–3:29 p.m. | 30 for 45 minutes |
| 3:30 p.m.–6:29 p.m. | 30 for 20 minutes |
| 6:30 p.m.–8:59 p.m. | 30 for 30 minutes |

Example 8—Composite Resource: Oil Change

| | |
|---|---|
| 9:00 a.m.–10:59 a.m. | $30, plus free car wash |
| 11:00 a.m.–12:59 p.m. | 30 |
| 1:00 p.m.–3:29 p.m. | 30 plus free car wash |
| 3:30 p.m.–6:29 p.m. | 30 without tire pressure check |
| 6:30 p.m.–8:59 p.m. | 30 |

Example 9—Composite Resource: Laser Eye Surgery

| | |
|---|---|
| 9:00 a.m.–10:59 a.m. | $2,999, plus $200 cash back |
| 11:00 a.m.–12:59 p.m. | 2,999 |
| 1:00 p.m.–3:29 p.m. | 2,999, plus $200 cash back |
| 3:30 p.m.–6:29 p.m. | 2,999 |
| 6:30 p.m.–8:59 p.m. | 2,999 |

Example 10—Composite Resource: Laser Eye Surgery

| | |
|---|---|
| 9:00 a.m.–10:59 a.m. | $2,999, plus 6.0% financing |
| 11:00 a.m.–12:59 p.m. | 2,999, plus 8.0% financing |
| 1:00 p.m.–3:29 p.m. | 2,999, plus 6.0% financing |
| 3:30 p.m.–6:29 p.m. | 2,999, plus 10.0% financing |
| 6:30 p.m.–8:59 p.m. | 2,999, plus 8.0% financing |

Example 11—Composite Resource: Consultant

| | |
|---|---|
| 8:00 a.m.–4:59 a.m. | $50 |
| 5:00 p.m.–7:59 a.m. | 60 |
| Weekends | 80 |

Example 12—Composite Resource: Haircut

| | |
|---|---|
| Monday | $ 9 |
| Tuesday | 10 |
| Wednesday | 10 |
| Thursday | 11 |
| Friday | 12 |
| Saturday | 14 |
| Sunday | 14 |

Example 13—Composite Resource: Haircut

| | |
|---|---|
| Stylist - Sue Mills | $ 9 |
| Stylist - Sarah Monroe | 14 |
| Stylist - Bill Jones | 12 |
| Stylist - Jane Wilson | 10 |

Example 14—Composite Resource: Haircut

| | |
|---|---|
| Stylist - 3.0 preference rating | $ 9 |
| Stylist - 4.8 preference rating | 14 |
| Stylist - 4.2 preference rating | 12 |
| Stylist - 3.5 preference rating | 10 |

Example 15—Composite Resource: Haircut

| | |
|---|---|
| Stylist - Mutt's Cuts | $ 9 |
| Stylist - New Age Salon | 45 |
| Stylist - Sally's Beauty Parlor | 12 |
| Stylist - Sam's Barbers | 10 |

As a further embodiment of the present invention, the YMS 16 can operate entirely outside a transaction reservations system 11.

EXAMPLES

Three examples, a user-driven example, a resource network-driven example and a dual party-driven example will serve to describe representative uses for the present invention.

Example 1

In the user-driven example, a user desires to have a service performed. The user initiates contact on a Monday afternoon with the transaction reservation system 11 through a user interface 12. Using their saved "Haircut" user profile (the profile indicating a search based on the characteristics of female, with over five years of experience, licensed cosmetologist, Sam's Barbers, performance rating of 4.5 or greater on a 5.0 scale, business within 5 miles of the home), they perform a search from among those composite resources listed as available (by their input parameters) starting between 2:00 p.m. and 3:00 p.m. on Friday May 18$^{th}$, 2000. Based on their query, the results:

Beth Smith, 2:00 p.m.-2:45 p.m., $13/($15), 4.8, Sam's Barbers, 3130 Excelsior Blvd.
Sandy Lubeck, 2:30 p.m.-3:15 p.m., $12/($14), 4.5, Sam's Barbers, 3130 Excelsior Blvd.

The user chooses Sandy Lubeck beginning at 2:30 p.m. for $12 and submits an appointment request. She immediately receives a confirmation from the resource network reservation system 14 accepting her request. Notice that Sandy's $12 transaction price is $2 off her standard $14 price because of the time off-peak appointment time. Notice also that Sandy's standard transaction price is $1 less than Beth's, relating to a lower historic demand for her services relative to Beth's.

Example 2

In the resource network-driven example, a resource desires to maximize their revenue. At 11:20 p.m., the computer initiates a routine it performs every 30 minutes where it calculates forecast excess capacity (Available resources—scheduled appointments+expected cancellations-expected walk-up service) 70 and 100 minutes into the future. Based on forecast excess capacity of one composite resource at 70 minutes and 2 composite resources at 100 minutes, the system initiates a communication to registered users with the following user-profile (requested special offer communications, resource service location 9 within 5 miles of user's home or work location, within 10 days of routine appointment schedule). The communication is sent to a group of 16 people matching the query inputs in the form of an e-mail or calendar alert, notifying the user of the following offers available for immediate reservation:

Beth Smith, 12:30 p.m.—1:15 p.m., $11/($15), 4.8, Sam's Barbers, 3130 Excelsior Blvd.
Sandy Lubeck, 1:00 p.m.—1:45 p.m., $11/($14), 4.5, Sam's Barbers, 3130 Excelsior Blvd.
Beth Smith, 1:15 p.m.-2:00 p.m., $12/($15), 4.8, Sam's Barbers, 3130 Excelsior Blvd.

Two people respond, requesting the following resources (which are immediately confirmed):
Beth Smith, 12:30 p.m.-1:15 p.m., $11/($15), 4.8, Sam's Barbers, 3130 Excelsior Blvd.
Beth Smith, 1:15 p.m.-2:00 p.m., $12/($15), 4.8, Sam's Barbers, 3130 Excelsior Blvd.

If no one schedules an appointment with Sandy Lubeck within the next 30 minutes, her offer will again appear during the next 30 minute cycle, likely at a further reduced price (or to a new group of potential users).

Notice in this example that Beth Smith's composite resource transaction price declines as the expiration time approached, further inciting a prospective user.

Example 3

In the dual party-driven example, a user (perhaps, being notified by the resource network that they are within 10 days of their normal appointment cycle) requests to receive special offers for "Haircut" composite resources delivered to their mobile communication device (or PDA or other). While in their car at 1:20 p.m., they drive through an intersection within signal reach of signal (wireless, RF or other) transmitter sending "Haircut" composite resource special offers for a at least one resource network location 9 within a short driving distance. The mobile communication device rings and a message appears on it's screen, communicating a composite resource transaction offer available for immediate reservation:

Beth Smith, 1:30 p.m.-2:15 p.m., $11/($15), 4.8, Sam's Barbers, 3130 Excelsior Blvd.

The user, attempting to secure the reservation, presses a key on their mobile communication device (thereby making the reservation request). A message to or audible response from the mobile communication device confirms the reservation. The user then drives immediately to the resource network location 9.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer-based method for capacity/demand management, comprising:
    accepting from a first party transaction parameter values for composite resources, wherein each composite resource has associated therewith at least a service location, a service date, a service time and a transaction price parameter, via a computer device containing a first program with a first program routine programmed to accept transaction parameter values;
    transmitting the accepted transaction parameter values through a computer-based communication from the first party's device to one or more computer devices upon which is stored a second program;
    receiving the transmitted transaction parameter values into the second program with a set of program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;
    storing the received transaction parameter values and information differentiating the first party, through use of the third routine of the second program into the one or more data stores;
    accepting from a second party at least one user-selected search criterion, via a computer device containing a third program with a first program routine programmed to accept search criteria;
    transmitting the accepted search criteria through a computer-based communication from the second party's device to one or more computer devices upon which is stored the second program;
    receiving the transmitted search criteria into the second program with a fourth program routine programmed to perform a comparison;
    comparing the received search criteria to the stored transaction parameter values for composite resources contained within the one or more data stores through the fourth program routine of the second program;
    transmitting at least a portion of the transaction parameter values for at least one available composite resource related to the second party's search criteria through a computer-based communication from the computer device containing the fourth program routine of the second program performing the comparison to the second party's device;
    receiving the transmission into the third program contained on the second party's device with a second program routine programmed to communicate the transmission to the second party;
    communicating the transmission through the second program routine of the third program to the second party;
    accepting from the second party a reservation request for at least one composite resource from the communicated transmission, via a computer device containing the third program with a third program routine programmed to accept reservation requests;

transmitting the reservation request through a computer-based communication from the second party's device to one or more computer devices containing the second program;

receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

performing the availability, suitability, counter-offer and transmission determinations;

transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

communicating the transmission through the third program to the second party (fourth routine of the third program);

offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);

modifying through a tenth routine of the second program, in response to an acceptable match, at least one of the availability status of the composite resource and a measure of the remaining available capacity of the composite resource;

storing through an eleventh routine of the second program any modification to the availability status or measure in the one or more data stores;

storing through a twelfth routine of the second program information relating to the reservation, including information relating to the first and second parties, in the one or more data stores;

transmitting through an thirteenth routine of the second program one or more links to the information stored in the one or more data stores through a computer-based communication from the computer device into the first and third programs -contained on the first (first program) and second (third program) party's devices;

receiving the transmitted links into the first and third programs containing program routines (second and ninth, respectively) programmed to communicate the links;

communicating the transmission through the second program routine of the first program and ninth program routine of the third program to the first (first program) and second (third program) parties;

wherein the function of the first transmission by the first party is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one service date and service time is a date and time point or range measure indicating a present or future first date and time when the service is available;

wherein the service availability date and time is related to the availability of at least one service provider resource comprising in part the at least one composite resource;

wherein the at least one service provider resource is a human resource.

2. A computer-based capacity/demand management system, comprising:

means for accepting from a first party transaction parameter values for composite resources, wherein each composite resource has associated therewith at least a service location, a service date, a service time and a transaction price parameter, via a computer device containing a first program with a first program routine programmed to accept transaction parameter values;

means for transmitting the accepted transaction parameter values through a computer-based communication from the first party's device to one or more computer devices upon which is stored a second program;

means for receiving the transmitted transaction parameter values into the second program with a set of program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;

means for storing the received transaction parameter values through use of the third routine of the second program into the one or more data stores;

means for accepting from a second party at least one user-selected search criterion, via a computer device containing a third program with a first program routine programmed to accept search criteria;

means for transmitting the accepted search criteria through a computer-based communication from the second party's device to one or more computer devices upon which is stored the second program;

means for receiving the transmitted search criteria into the second program with a fourth program routine programmed to perform a comparison;

means for comparing the received search criteria to the stored transaction parameter values for composite resources contained within the one or more data stores through the fourth program routine of the second program;

means for transmitting at least a portion of the transaction parameter values for at least one available composite resource related to the second party's search criteria through a computer-based communication from the computer device containing the fourth program routine of the second program performing the comparison to the second party's device;

means for receiving the transmission into the third program contained on the second party's device with a second program routine programmed to communicate the transmission to the second party;

means for communicating the transmission through the second program routine of the third program to the second party;

means for accepting from the second party a reservation request for at least one composite resource from the communicated transmission, via a computer device containing the third program with a third program routine programmed to accept reservation requests;

means for transmitting the reservation request through a computer-based communication from the second party's device to one or more computer devices containing the second program;

means for receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

means for performing the availability, suitability, counter-offer and transmission determinations;

means for transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

means for receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

means for communicating the transmission through the third program to the second party (fourth routine of the third program);

means for offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);

means for modifying through a tenth routine of the second program, in response to an acceptable match, at least one of the availability status of the composite resource and a measure of the remaining available capacity of the composite resource;

means for storing through an eleventh routine of the second program any modification to the availability status or measure in the one or more data stores;

means for storing through a twelfth routine of the second program information relating to the reservation, including information relating to the first and second parties, in the one or more data stores;

means for transmitting through a thirteenth routine of the second program one or more links to the information stored in the one or more data stores through a computer-based communication from the computer device into the first and third programs contained on the first (first program) and second (third program) party's devices;

means for receiving the transmitted links into the first and third programs containing program routines (second and ninth, respectively) programmed to communicate the links;

means for communicating the transmission through the second program routine of the first program and ninth program routine of the third program to the first (first program) and second (third program) parties;

wherein the function of the first transmission by the first party is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one service date and service time is a date and time point or range measure indicating a present or future first date and time when the service is available;

wherein the service availability date and time is related to the availability of at least one service provider resource comprising in part the at least one composite resource;

wherein the at least one service provider resource is a human resource.

3. A capacity/demand management system comprising:

a first storage device storing a program;

at least one processor connected to the storage device and controlled by the program, the at least one processor operative with the program to receive from a first party transmitted transaction parameter values and to access and store them into one or more data stores said program configured to accept and said one or more data stores configured to contain transaction parameter values from at least two differentiable first parties, to receive from a second party transmitted search criteria, to compare the received search criteria to the stored transaction parameter values for composite resources contained within the one or more data stores, to transmit at least a portion of the transaction parameter values for at least one available composite resource related to the second party's search criteria to the second party's device, to receive from the second party transmitted reservation requests relating to the previously-transmitted transaction parameter values, to evaluate the status of any requested resources to indicate whether they are available for reservation or not, and whether suitable composite resources with alternate transaction parameter values are available, to evaluate the suitability of alternate composite resources based on program instructions accessing decision rules entered by the program administrator, the first party or the second party, to determine an acceptable alternate match between requested and available resources, to determine a reasonable counter-offer given the available composite resources, the reservation request and the results of any previous counter-offers, to determine appropriate transmissions for the acceptance, counter-offer or rejection of the reservation request, to transmit to the second party based on the availability, suitability, counter-offer and transmission determinations at least one of a confirmation of the reservation request, a counter-offer to the reservation request and a rejection of the reservation request, to iterate the above reservation request steps until a suitability match is successfully made or the program or the second user determines that no suitable composite resource exists for reservation, to modify, in response to an acceptable match, at least one of the availability status of the composite resource and a measure of the remaining available capacity of the composite resource, to store any modification to the availability status or measure in the one or more data stores, to store information relating to the reservation, including information relating to the first and second parties, in the one or more data stores, and, to transmit one or more links to the stored information to the first and second party's devices;

one or more second storage devices storing a program;

at least one processor connected to the one or more storage devices and controlled by the program, the at least one processor operative with the program to accept from a first party transaction parameter values for composite resources, wherein each composite resource has associated therewith at least a service location, a service date, a service time and a transaction price parameter, to transmit the accepted transaction parameter values to the first program, to receive transmitted links relating to the transaction parameter values, and to communicate the information contained in the transmitted links to the device user;

a third storage device storing a program; and at least one processor connected to the storage device and controlled by the program, the at least one processor operative with the program to accept at least one user-selected search criterion relating to transaction parameter values for composite resources, to transmit the accepted search criteria to the first program, to receive a transmission containing at least a portion of the transaction parameter values for at least one available composite resource related to the search criteria, to communicate the transmission to the device user, to accept a reservation request for at least one composite resource from the communicated transmission, to transmit the reservation request to the first program, to receive a transmission containing a confirmation, counter-offer or rejection, to communicate the transmission to the device user, to offer for acceptance by the device user any counter-offered composite resources and to iterate the above reservation request steps until a suitability match is successfully made or the program or the user determines that no suitable composite resource exists for reservation, to receive transmitted links relating to the transaction parameter values, and to communicate the information contained in the transmitted links to the device user;

wherein the function of the first transmission by the first party from the second program is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one service date and service time is a date and time point or range measure indicating a present or future first date and time when the service is available;

wherein the service availability date and time is related to the availability of at least one service provider resource comprising in part the at least one composite resource;

wherein the at least one service provider resource is a human resource.

4. One or more non-transitory computer-readable media containing program instructions for controlling a computer to perform a method comprising:

accepting from a first party transaction parameter values related to individual resources and associated composite resources, wherein the associated composite resources each include a collection of at least two of the individual resources, wherein the associated composite resources each have associated therewith at least a service location, a service date, a service time and a transaction price parameter;

storing the data related to the individual resources and the associated composite resources;

constructing internal data structures which link each of the individual resources to associated composite resources and link each of the composite resources to associated individual resources, and which like each composite resource to the first party;

indicating when a capacity of a composite resource exceeds a demand for the composite resource;

modifying, in response to the indication, a transaction price parameter for the composite resource;

accepting from a second party, via computer, at least one user-selected search criterion;

comparing the at least one user-selected search criterion accepted to the accepted transaction parameter values for composite resources;

communicating to the second party at least a portion of the transaction parameter values for at least one available composite resource related to the potential user's at least one user-selected search criterion;

receiving a responding communication from the second party attempting to reserve at least one composite resource with specified transaction parameter values;

evaluating the status of any requested resources to indicate whether they are available for reservation or not, and whether suitable composite resources with alternate transaction parameter values are available;

evaluating the suitability of alternate composite resources based on program instructions accessing decision rules entered by the program administrator, the first party or the second party, to determine an acceptable alternate match between requested and available resources;

determining a reasonable counter-offer given the available composite resources, the reservation request and the results of any previous counter-offers;

determining appropriate transmissions for the acceptance, counter-offer or rejection of the reservation request communicating to the second party to the second party based on the availability, suitability, counter-offer and transmission determinations at least one of a confirmation of the reservation request, a counter-offer to the reservation request and a rejection of the reservation request;

iterating the above reservation request steps until a suitability match is successfully made or the program or the second user determines that no suitable composite resource exists for reservation;

modifying in response to an acceptable match, at least one of the availability status of the composite resource and a measure of the remaining available capacity of the composite resource;

storing any modification to the availability status or measure in the one or more data stores;

storing information relating to the reservation, including information relating to the first and second parties, in the one or more data stores, and, transmitting one or more links to the stored information to the first and second party's devices;

wherein the function of the first transmission by the first party is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one service date and service time is a date and time point or range measure indicating a present or future first date and time when the service is available;

wherein the service availability date and time is related to the availability of at least one service provider resource comprising in part the at least one composite resource;

wherein the at least one service provider resource is a human resource.

5. A computer-based method for producing composite resource transactions, the method comprising:

accepting from a first party transaction parameter values for composite resources, wherein each composite resource has associated therewith at least a service location, a service date, a service time and a transaction price parameter, via a computer device containing a first program with a first program routine programmed to accept transaction parameter values;

transmitting the accepted transaction parameter values through a computer-based communication from the first party's device to one or more computer devices upon which is stored a second program;

receiving the transmitted transaction parameter values into the second program with a set of program routines programmed to receive (first routine), access second routine) and store (third routine) transaction parameter values into one or more data stores stored in memory on one or more computer devices, said program configured to accept and said one or more data stores configured to contain transaction parameter values from at least two differentiable first parties;

storing the received transaction parameter values through use of the third program routine of the second program into the one or more data stores;

accepting from a second party at least one user-selected search criterion, via a computer device containing a third program with a first program routine programmed to accept search criteria;

transmitting the accepted search criteria through a computer-based communication from the second party's device to one or more computer devices upon which is stored the second program;

receiving the transmitted search criteria into the second program with a fourth program routine programmed to perform a comparison;

comparing the received search criteria to the stored transaction parameter values for composite resources contained within the one or more data stores through the fourth program routine of the second program;

transmitting at least a portion of the transaction parameter values for at least one available composite resource related to the second party's search criteria through a computer-based communication from the computer device containing the fourth program routine of the second program performing the comparison to the second party's device;

receiving the transmission into the third program contained on the second party's device with a second program routine programmed to communicate the transmission to the second party;

communicating the transmission through the second program routine of the third program to the second party;
accepting from the second party a reservation request for at least one composite resource from the communicated transmission, via a computer device containing the third program with a third program routine programmed to accept reservation requests;
transmitting the reservation request through a computer-based communication from the second party's device to the computer device containing the second program;
receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);
performing the availability, suitability, counter-offer and transmission determinations;
transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;
receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made sixth routine) or the program (seventh routine) or the second user (eighth routine) determines that no suitable composite resource exists for reservation (ninth routine);
communicating the transmission through the third program to the second party (fourth routine of the third program);
offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);
modifying through a tenth routine of the second program, in response to an acceptable match, at least one of the availability status of the composite resource and a measure of the remaining available capacity of the composite resource;
storing through an eleventh routine of the second program any modification to the availability status or measure in the one or more data stores;
storing through a twelfth routine of the second program information relating to the reservation, including information relating to the first and second parties, in the one or more data stores;
transmitting through a thirteenth routine of the second program one or more links to the information stored in the one or more data stores through a computer-based communication from the computer device into the first and third programs contained on the first (first program) and second (third program) party's devices
receiving the transmitted links into the first and thirda programs containing program routines (second and ninth, respectively) programmed to communicate the links;
communicating the transmission through the second program routine of the first program and ninth program routine of the third program to the first (first program) and second (third program) parties,
wherein the function of the first transmission by the first party is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;
wherein the at least one service date and service time is a date and time point or range measure indicating a present or future first date and time when the service is available;
wherein the service availability date and time is related to the availability of at least one service provider resource comprising in part the at least one composite resource;
wherein the at least one service provider resource is a human resource.

* * * * *